(12) United States Patent
Jatunov et al.

(10) Patent No.: US 12,216,222 B2
(45) Date of Patent: Feb. 4, 2025

(54) REFERENCE SIGNAL DESIGN AND DEVICE PROCEDURES FOR DOWNLINK-BASED POSITIONING/RANGING USING MULTI-FREQUENCY PHASE DIFFERENCE OF ARRIVAL

(71) Applicant: INTERDIGITAL PATENT HOLDINGS, INC., Wilmington, DE (US)

(72) Inventors: Loran Jatunov, Raritan, NJ (US); Hussain Elkotby, Conshohocken, PA (US); Tanbir Haque, Jackson Heights, NY (US); Patrick Cabrol, Bayshore, NY (US); Ravikumar Pragada, Warrington, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 258 days.

(21) Appl. No.: 17/796,187

(22) PCT Filed: Jan. 29, 2021

(86) PCT No.: PCT/US2021/015793
§ 371 (c)(1),
(2) Date: Jul. 28, 2022

(87) PCT Pub. No.: WO2021/155210
PCT Pub. Date: Aug. 5, 2021

(65) Prior Publication Data
US 2023/0074373 A1 Mar. 9, 2023

Related U.S. Application Data

(60) Provisional application No. 63/051,709, filed on Jul. 14, 2020, provisional application No. 62/967,953, filed on Jan. 30, 2020.

(51) Int. Cl.
*G01S 5/02* (2010.01)
*G01S 11/02* (2010.01)
(Continued)

(52) U.S. Cl.
CPC ............. *G01S 5/0244* (2020.05); *G01S 11/02* (2013.01); *G01S 13/84* (2013.01); *H04W 64/003* (2013.01)

(58) Field of Classification Search
CPC ..... H04W 64/00; H04W 24/10; H04W 72/23; H04W 64/003; H04W 72/0446;
(Continued)

(56) References Cited

U.S. PATENT DOCUMENTS 10,746,842 B2  8/2020  Kim et al.
11,006,247 B2  5/2021  Chae et al.
(Continued)

OTHER PUBLICATIONS

Huawei et al., "Reference Signal for fine time and frequency tracking," 3GPP TSG RAN WG1 Meeting #88, R1-1701700, Athens, Greece (Feb. 13-17, 2017).
(Continued)

*Primary Examiner* — Olumide Ajibade Akonai
(74) *Attorney, Agent, or Firm* — Volpe Koenig

(57) ABSTRACT

A method for use in a wireless transmit/receive unit (WTRU) configured to communicate through a zero energy (ZE) interface in accordance with an embodiment disclosed herein is provided. The method includes the WTRU receiving, a first positioning reference signal (PRS) resource with parameters characterizing the first PRS and determining the suitability of the first PRS resource for use by the WTRU. The method also includes measuring the phase difference of arrival (PDOA) for available frequency pairs and generating a range estimate based on the PDOA measurement. Further, the method includes the WTRU evaluating a reliability of
(Continued)

the PDOA measurement and an accuracy of the range estimate and, on a condition that a sufficient accuracy has been achieved, reporting the range estimate.

20 Claims, 19 Drawing Sheets

(51) Int. Cl.
*G01S 13/84* (2006.01)
*H04W 64/00* (2009.01)

(58) Field of Classification Search
CPC ... H04W 56/001; H04W 72/044; H04W 4/02; H04W 92/18; H04W 4/029; G01S 5/0036; G01S 5/10; G01S 2205/008; G01S 5/12; G01S 5/06
See application file for complete search history.

(56) References Cited

U.S. PATENT DOCUMENTS

| | | | |
|---|---|---|---|
| 11,277,812 | B2 | 3/2022 | Kim et al. |
| 2017/0374638 | A1* | 12/2017 | Han .................. H04J 11/00 |
| 2018/0048444 | A1* | 2/2018 | Park .................. H04J 11/0079 |
| 2019/0327707 | A1* | 10/2019 | Agnihotri ............. G01S 5/10 |
| 2021/0297216 | A1* | 9/2021 | Shreevastav .......... G01S 1/20 |
| 2022/0038239 | A1* | 2/2022 | Guo .................. G01S 5/0236 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
Li et al., "Multifrequency-Based Range Estimation of RFID Tags", 2009 IEEE International Conference on RFID, pp. 147-154 (2009).
Third Generation Partnership Project, "Technical Specification Group Radio Access Network NR Radio Resource Control (RRC) protocol specification (Release 15)," 3GPP TS 38.331 V15.8.0 (Dec. 2019).
Third Generation Partnership Project, "Technical Specification Group Radio Access Network; NR; Physical channels and modulation (Release 15)," 3GPP TS 38.211 V15.8.0 (Dec. 2019).
Third Generation Partnership Project, "Technical Specification Group Radio Access Network; NR; Physical channels and modulation (Release 16)," 3GPP TS 38.211 V16.0.0 (Dec. 2019).
Third Generation Partnership Project, "Technical Specification Group Radio Access Network; NR; Physical layer procedures for control (Release 15)," 3GPP TS 38.213 V15.8.0 (Dec. 2019).
Third Generation Partnership Project, "Technical Specification Group Radio Access Network; NR; Physical layer procedures for control (Release 15)," 3GPP TS 38.213 V16.0.0 (Dec. 2019).
Third Generation Partnership Project, "Technical Specification Group Radio Access Network; NR; Physical channels and modulation (Release 16)," 3GPP TS 38.211 V16.4.0 (Dec. 2020).
Third Generation Partnership Project, "Technical Specification Group Radio Access Network; NR; Physical layer procedures for control (Release 15)," 3GPP TS 38.213 V15.12.0 (Dec. 2020).
Third Generation Partnership Project, "Technical Specification Group Radio Access Network; NR; Physical layer procedures for control (Release 16)," 3GPP TS 38.213 V16.4.0 (Dec. 2020).
Third Generation Partnership Project, "Technical Specification Group Radio Access Network; NR; Radio Resource Control (RRC) protocol specification (Release 15)," 3GPP TS 38.331 V15.12.0 (Dec. 2020).
Third Generation Partnership Project, "Technical Specification Group Radio Access Network; NR; Radio Resource Control (RRC) protocol specification (Release 16)," 3GPP TS 38.331 V16.3.1 (Jan. 2021).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.12.0 (Dec. 2020).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.8.0 (Dec. 2019).
Third Generation Partnership Project, Technical Specification Group Radio Access Network; Evolved Universal Terrestrial Radio Access (E-UTRA); Radio Resource Control (RRC); Protocol specification (Release 16),' 3GPP TS 36.331 V16.3.0 (Dec. 2020).
Third Generation Partnership Project, "Technical Specification Group Radio Access Network; Evolved Universal Terrestrial Radio Access (E-UTRA); Physical channels and modulation (Release 16)," 3GPP TS 36.211 V16.4.0 (Dec. 2020).
Third Generation Partnership Project, "Technical Specification Group Radio Access Network; Evolved Universal Terrestrial Radio Access (E-UTRA); Physical channels and modulation (Release 16)," 3GPP TS 36.211 V16.0.0 (Dec. 2019).
Third Generation Partnership Project, "Technical Specification Group Radio Access Network; Evolved Universal Terrestrial Radio Access (E-UTRA); Physical channels and modulation (Release 15)," 3GPP TS 36.211 V15.12.0 (Dec. 2019).
Third Generation Partnership Project, "Technical Specification Group Radio Access Network; Evolved Universal Terrestrial Radio Access (E-UTRA); Physical channels and modulation (Release 15)," 3GPP TS 36.211 V15.8.1 (Jan. 2020).

* cited by examiner

REFERENCE SIGNAL DESIGN AND DEVICE PROCEDURES FOR DOWNLINK-BASED POSITIONING/RANGING USING MULTI-FREQUENCY PHASE DIFFERENCE OF ARRIVAL

CROSS REFERENCE TO RELATED APPLICATIONS

This application is the U.S. National Stage, under 35 U.S.C. § 371, of International Application No. PCT/US2021/015793 filed Jan. 29, 2021, which claims the benefit of U.S. Provisional Application No. 62/967,953 filed Jan. 30, 2020 and U.S. Provisional Application No. 63/051,709 filed Jul. 14, 2020, which is incorporated by reference as if fully set forth.

BACKGROUND

For some mobile device uses cases, there is a demand for alternatives to satellite-based (e.g., GNSS) positioning in mobile devices (e.g., handhelds to IoT/MTC objects, Ultra-Low Power (ULP) devices, wearables, and fitness trackers) due to unavailability of GNSS coverage in indoor environments, power consumption requirements, and electronic complexity of GNSS receivers.

SUMMARY

A method for use in a wireless transmit/receive unit (WTRU) configured to communicate through a zero energy (ZE) interface in accordance with an embodiment disclosed herein is provided. The method includes the WTRU receiving, a first positioning reference signal (PRS) resource with parameters characterizing the first PRS and determining the suitability of the first PRS resource for use by the WTRU. The method also includes measuring the phase difference of arrival (PDOA) for at least one of available frequency pairs and generating a range estimate based on a multi-frequency (MF)-PDOA measurement using the first PRS resource. Further, the method includes the WTRU evaluating a reliability of the PDOA measurement and an accuracy of the range estimate and, on a condition that the first PRS resource is determined to not be suitable for use by the WTRU, on a condition that the MF-PDOA measurement is determined to not be sufficiently reliable, or on a condition that the range estimate is determined to not be sufficiently accurate, requesting a second PRS resource and its associated parameters, wherein the parameters of the second PRS resource differ from the parameters of the first PRS resource. It also includes, on a condition that a sufficient accuracy has been achieved, reporting the range estimate.

In accordance with an embodiment disclosed herein a wireless transmit/receive unit (WTRU) configured to communicate through a zero energy (ZE) interface is provided. The WTRU includes a transceiver and a ZE receiver. The ZE receiver can receive a first positioning reference signal (PRS) resource with parameters characterizing the first PRS. The WTRU further includes a processor configured to determine the suitability of the first PRS resource for use by the WTRU and measure the phase difference of arrival (PDOA) for at least one of available frequency pairs. The processor is also configured to generate a range estimate based on a MF-PDOA measurement using the first PRS resource, evaluate a reliability of the PDOA measurement and an accuracy of the range estimate, and further configured to, on a condition that the first PRS resource is determined to not be suitable for use by the WTRU, on a condition that the MF-PDOA measurement is determined to not be sufficiently reliable, or on a condition that the range estimate is determined to not be sufficiently accurate, request a second PRS resource and its associated parameters, wherein the parameters of the second PRS resource differ from the parameters of the first PRS resource. The processor is also configured to, on a condition that a sufficient accuracy has been achieved, report the range estimate.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION OF THE PREFERRED EMBODIMENT(S)

Figure 1A:
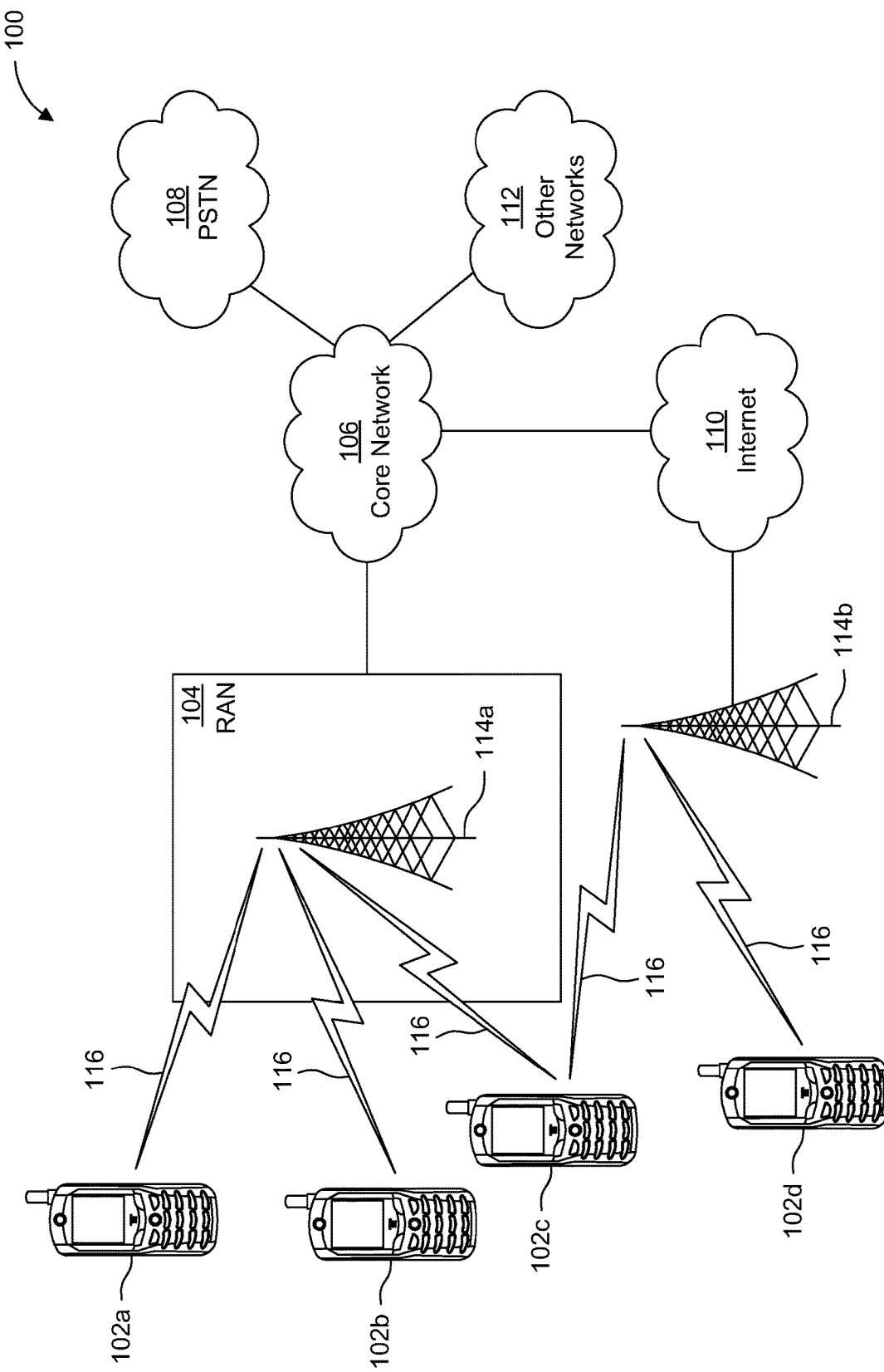
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, IoT/MTC objects, Ultra-Low Power (ULP) devices, wearables, fitness trackers, a device operating on commercial and/or industrial wireless networks, and the like. Any of the WTRUs 102a, 102b, 102c and 102d may be interchangeably referred to as a UE, terminal, mobile device, or the like.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
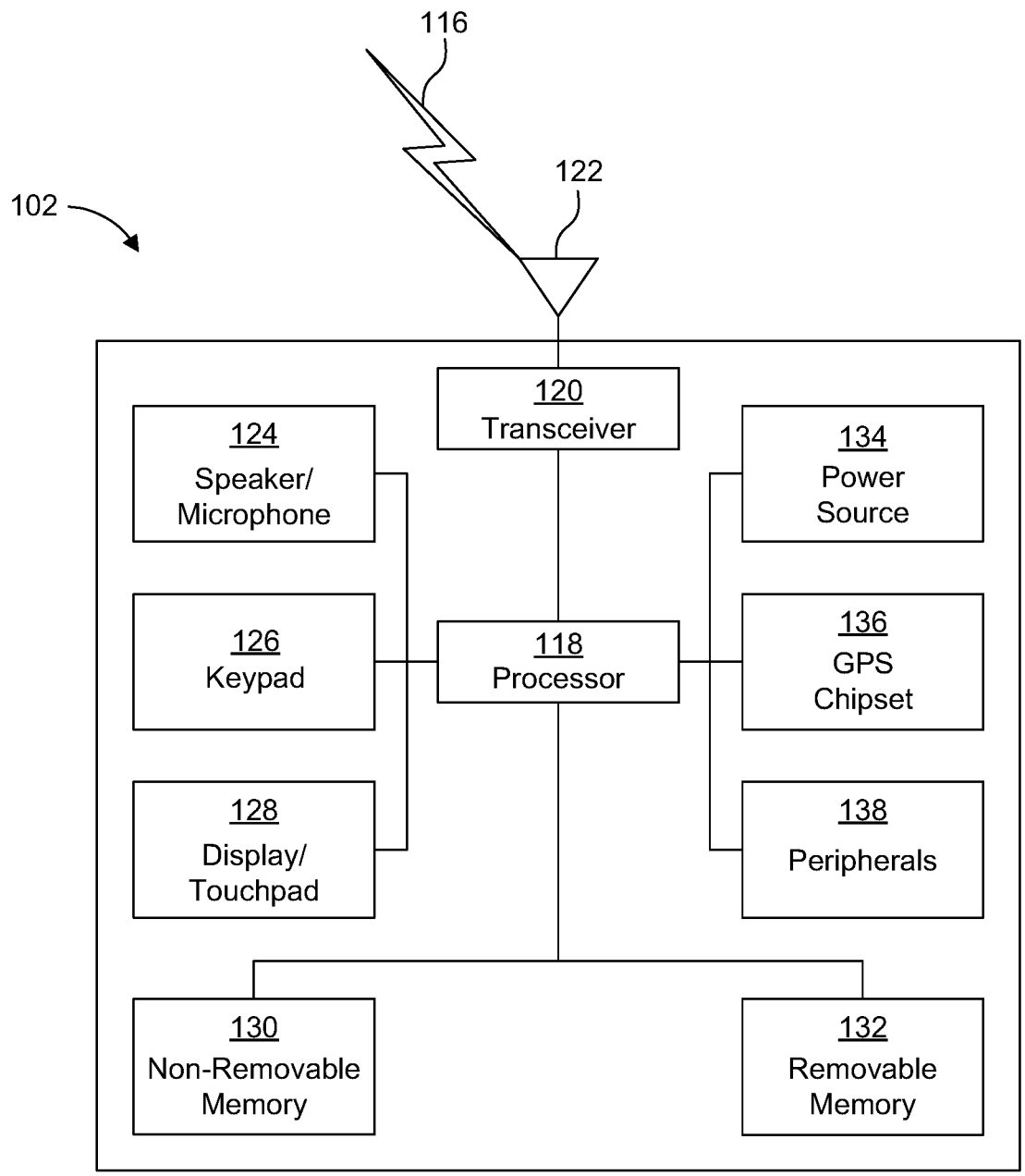
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136 (or other component(s) that provide means of positioning and ranging), and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
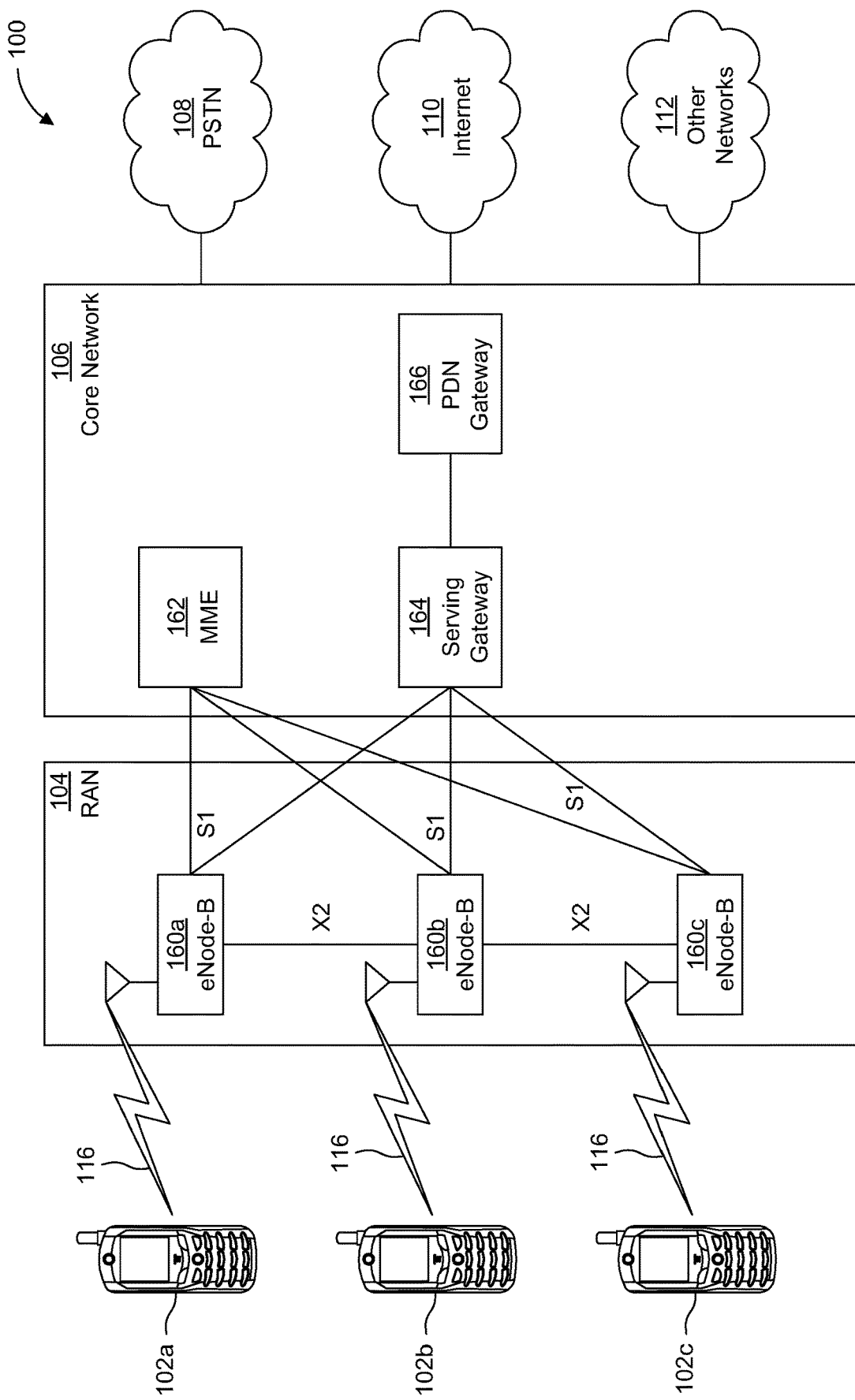
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
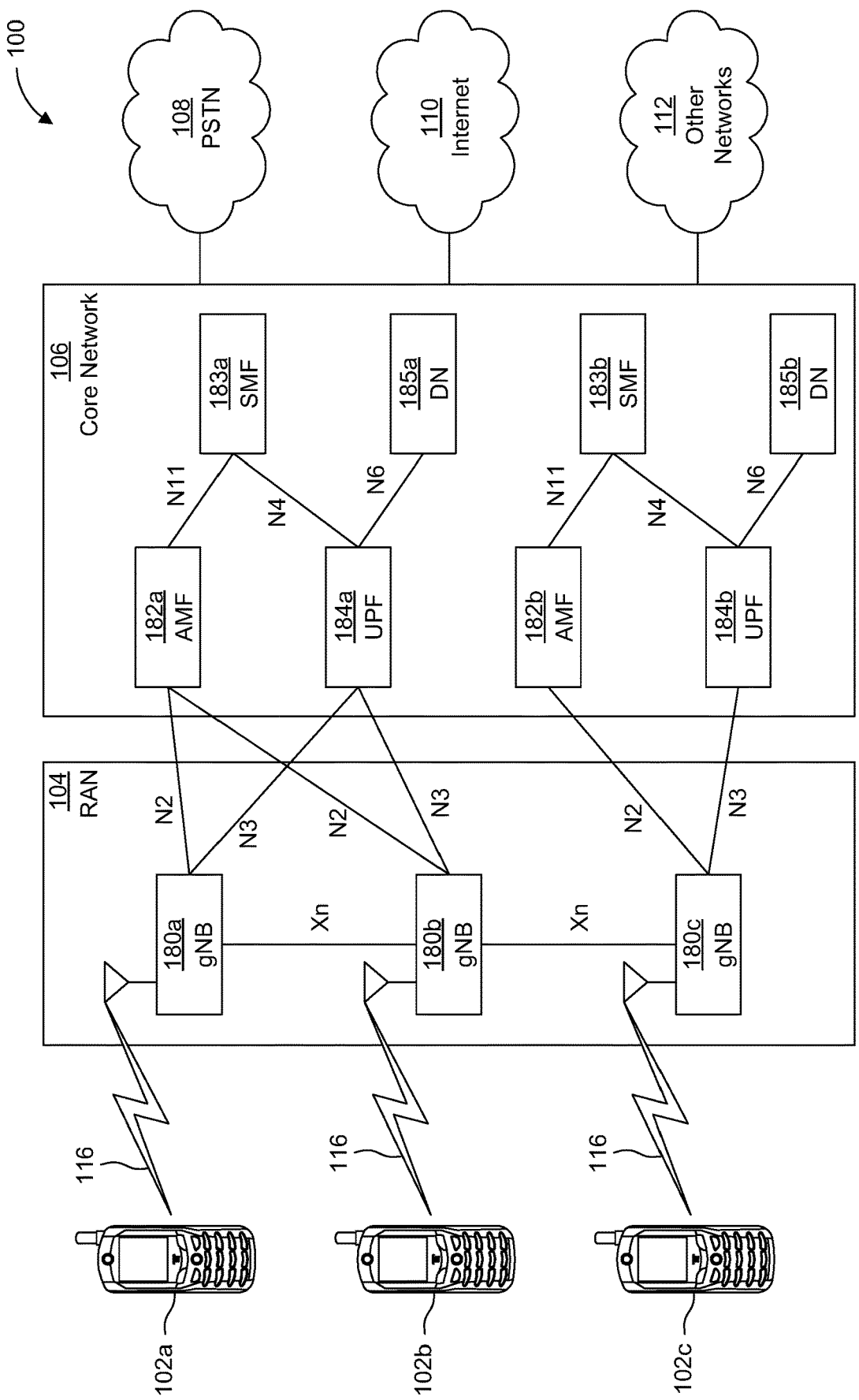
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In the example systems and devices of FIGS. 1A, 1B, 1C, and 1D, a WTRU may employ techniques that involve alternatives to satellite-based positioning. Further, there are use cases and technological needs for alternatives to satellite-based positioning in devices, such as handhelds and IoT/MTC objects, Ultra-Low Power (ULP) devices, wearables, and fitness trackers. For example, devices using LTE/NR may experience poor GNSS reception or no reception at all in various indoor environments such as malls. ULP devices, also known as Zero-Energy (ZE) devices, allow dramatic savings in power consumption compared to legacy devices; however, their electronic components, such as so-called "passive" components such as Schottky diodes and MEMs, may not have the capability for satellite-based positioning let alone meet energy demands for a given use case.

Generally, the following may serve as abbreviations of terminology used herein: AN Access Node; BW Bandwidth; CRS Cell-Specific Reference Signal; CRT Chinese Remainder Theorem; C-V2X Cellular Vehicle-to-Everything; CW Unmodulated Continuous Wave; CW-RS CW reference signal; D2D device to device communication; DL Downlink; ED Energy Detect; FTM Fine-Time Measurement; IE Information Element; IoT Internet of Things; IIoT Industrial IoT; LOS Line of Sight; MF-PDOA Multifrequency Phase Difference of Arrival; MTC Machine Type Communications; NR New Radio (5G); NW Network; ProSe Proximity Service; PRS Positioning Reference Signal; RB Resource Block; RF Radio Frequency; RTT Round-Trip Time; SCS Subcarrier Spacing; TA Timing Advance; ToF Time of Flight; TRS Tracking Reference Signal; TRX Transceiver; UE User Equipment; UL Uplink; ULP Ultra-low Power; ZE Zero-energy.

Multifrequency Phase Difference of Arrival (MF-PDOA) is a radiolocation-based positioning technology/technique that lends itself to range estimation utilizing basic electronic components that make up some devices, such as ULP/ZE devices. In one example, MF-PDOA via backscattering may be used with RFIDs. Further, as discussed herein, MF-PDOA may be used with LTE/NR handsets as well as in GNSS-deprived environments. In considering a variety of environments, such as indoors or outdoors, MF-PDOA may be an appealing solution for LTE/NR devices, such as IoT and other electronic objects.

As described herein, a WTRU may be a device that utilizes MF-PDOA techniques and/or legacy techniques; this may be possible by utilizing the same hardware for the two techniques, or utilizing separate hardware for each techniques, respectively. As described herein, a network device may be a node on a network.

Phase difference of Arrival (PDOA), employed in the Downlink (DL), may comprise a network device transmitting a pair of unmodulated Continuous Waves (CW's), and the receiving device measuring the phase difference between the two arriving CW's to estimate the distance to the network device (i.e., the range). MF-PDOA may comprise of doing phase difference measurement(s) for multiple pairs of CW's.

MF-PDOA, as explained above, may be used to calculate the range between a ULP/ZE device to a particular AN. Additionally, a positioning scheme (e.g., Differential MF-PDOA) where MF-PDOA pairs are transmitted from different AN's to calculate the difference in ranges between the ULP/ZE device to each AN may be utilized to allow the ULP/ZE device to avoid the need for local oscillators. As discussed herein, a WTRU may be interchangeable with a ULP/ZE device.

Figure 2:
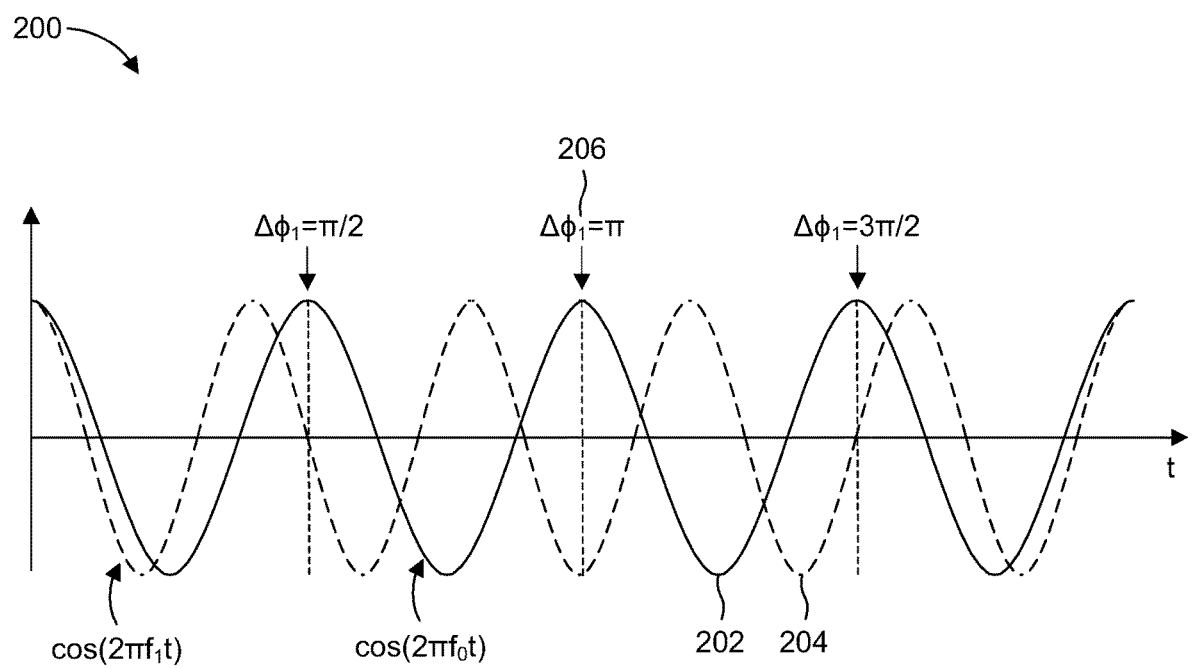
FIG. 2 is a graph illustrating an example of phase difference for a pair of unmodulated continuous waves with frequency $f_0$ and $f_1$.

FIG. 2 is a graph 200 illustrating an example of phase difference for a pair of unmodulated continuous waves 202 and 204 with frequency $f_0$ and $f_i$, respectively. In PDOA, a pair of CW's with frequencies $f_0$ and $f_i$ (frequency difference $\Delta f_i$) is radiated from one end, and the phase between the pair is measured at another end; the two ends may be the same (for a round-trip propagation). As described herein, the CW's may be radiated from an Access Node (AN), and the observed phase difference $\Delta\phi_i$ 206 may be measured at the WTRU (e.g., ULP/ZE device). In general, for the pair of CW's propagating over a distance $d=c \cdot t_d$, where c and $t_d$ are the speed of light and propagation time, respectively, the total phase difference may be: $\Delta\Phi_i = 2\pi \cdot \Delta f_i \cdot t_d$.

Since $\Delta\phi_i = \text{mod}(\Delta\Phi_i, 2\pi)$, the total phase difference may be rewritten as $$\Delta\Phi_i = \Delta\phi_i + 2\pi \cdot m, m \in \mathbb{N} \qquad \text{Equation 1}$$

The actual/true range $R_T$ may be shown to be $$R_T = \left\{\frac{\Delta\phi_i}{2\pi} + m\right\} \cdot \frac{c}{\Delta f_i}, \Delta\phi_i \in [0, 2\pi) \qquad \text{Equation 2}$$

However, $\Delta\phi_i$, which is wrapped around between 0 and $2\pi$, is all that may be measured and thus only an apparent/measured range $R_A$ may be measured (with values below a maximum range $R_{max,i}$).

$$R_T = R_A + m \cdot R_{max,i} \qquad \text{Equation 3}$$

$$\text{where } R_A = \frac{\Delta\phi_k}{2\pi} \cdot R_{max,i}, R_{max,i} = \frac{c}{\Delta f_i} \qquad \text{Equation 4}$$

Notice that when the true range is below $R_{max,i}$, only then the apparent range is correct, and so the measurable range is upper-limited by $R_{max,i}$, which in turn is determined by the $\Delta f_i$ of the pair of CW's.

One way to increase the maximum unambiguous range is to leverage multiple pairs of frequencies (the "MF" in MF-PDOA), each pair providing a phase difference, and combine the phase differences using mathematical techniques such as the Chinese Remainder Theorem (CRT).

CRT states that given a set of co-primes $\{\xi_k\}$ co-primes (numbers that are prime to one another, such that their greatest common divisor (gcd) is 1, for example numbers 3, 5, and 8. If the modulus of d with respect to the co-primes is given by a set of residues $\{a_k\}$ as in $$a_1 = \mod(d, \xi_1)$$
$$a_2 = \mod(d, \xi_2)$$
$$\vdots$$
$$a_k = \mod(d, \xi_k)$$

Equation 5

Then there are solutions in the form d+m·N, where m is an integer, and $$N = lcm(\{\xi_k\}) = \Pi_{i=1}^{i=k} \xi_i$$

Equation 6

Where lcd(•) is the least common multiplier function.

In our case, there is the following series of equations:

$$R = R_{A,1} + m_1 \cdot R_{max,1}$$
$$R = R_{A,2} + m_2 \cdot R_{max,2}$$
$$\vdots$$
$$R = R_{A,k} + m_k \cdot R_{max,k}$$

Equation 7

Where R correspond to d in Eq. 5; $R_{A,i}$, to $a_i$; $R_{max,i}$, to $\xi_i$; R, $R_{A,i}$, and $R_{max,i}$ represented in discrete values that are multiples of parameter $\Delta r$, which is explained below.

Range Bin Resolution $\Delta r$ (the term "Range Bin Resolution" is used to distinguish it from the actual individual bins—or "range bins") may be defined to have the following relation with the co-primes:

$$\Delta r = \frac{R_{max,i}}{\xi_i} = \frac{c}{\xi_i \cdot \Delta f_i}, \forall i$$

Equation 8

The parameter $\Delta r$ is equivalent to unity in the CRT list of equations (7). In other words, it is the granularity wherewith the range is defined. As $\Delta r$ is constant across all i, below equation defines the relationship between frequencies and co-primes:

$$\xi_i \cdot \Delta f_i = c/\Delta r, \forall i$$

Equation 9

In turn, the highest co-prime value may be determined by the reliable resolution in $\Delta \phi_i$ that a device may achieve for the given channel conditions.

All in all, the effective $R_{max}$, that is, the maximum effective unambiguous range, is increased by a factor $N/\xi_i$ with respect to $R_{max,i}$, the maximum unambiguous range for frequency pair i:

$$R_{max} = N \cdot \Delta r$$

Equation 10

And using Eqs. 6 and 9, $$R_{max} = \Delta r \cdot lcm(\{\xi_k\}) = lcm(\{\Delta r \cdot \xi_k\}) = lcm\left(\left\{\frac{c}{\Delta f_i}\right\}\right) = c \cdot lcm\left(\left\{\frac{1}{\Delta f_i}\right\}\right)$$

And since it is known that:

$$lcm(a, b) = \frac{|a \cdot b|}{gcd(a, b)}$$

Which implies that:

$$lcm(a^{-1}, b^{-1}) = \frac{1}{gcd(a, b)}$$

where gcd(•) is the greatest common divisor, then $$R_{max} = \frac{c}{gcd(\{\Delta f_i\})}$$

Equation 11

Figure 3:
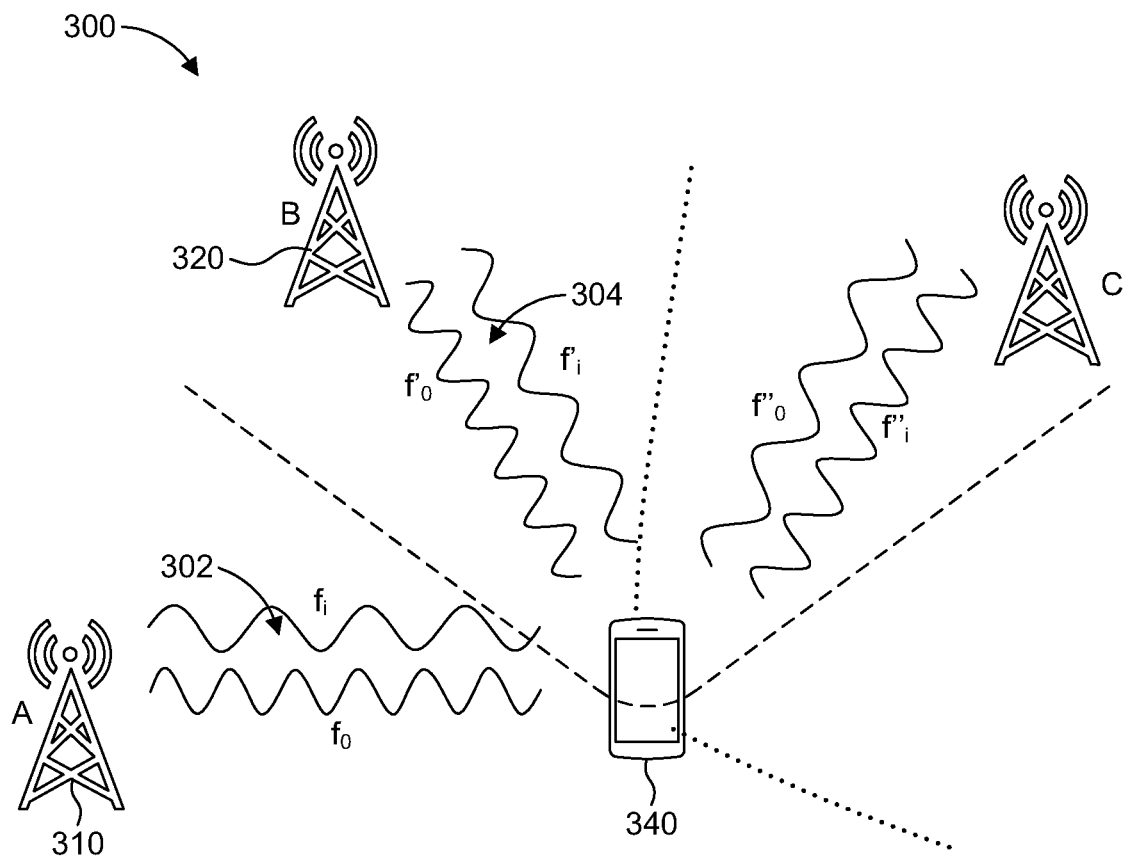
FIG. 3 is a diagram illustrating an example of a differential MF-PDOA scheme.

As can be seem in FIG. 3, in a differential PDOA scheme 300, two pairs of CW's may be transmitted at a time: one pair 302 of CW's with frequencies $f_0$ and $f_i$ is radiated from AN A 310; and, a second pair 304 of CW's with frequencies $f_0'$ and $f_i'$, from AN B 320. Both pairs may have the same frequency difference, such as $\Delta f_i = (f_i - f_0) = (f_i' - f_0')$. This couple of pairs may be used to calculate the difference in range between a WTRU 340 (e.g., a ZE device) to a AN A 310 on one hand and between a WTRU (e.g., ZE device) and AN B on the other hand. In addition, as disclosed herein, there may be a limited maximum unambiguous range associated with a $\Delta f_i$; hence, another couple of pairs with a different $\Delta f_1$ may be utilized to extend the maximum unambiguous (differential) range. Accordingly, in contrast to MF-PDOA, the term Differential MF-PDOA may refer to a location scheme whereby multiple couples of pairs of CW's (e.g., each couple using a different $\Delta f_i$) may be leveraged to obtain the difference in range between a WTRU (ZE device) 340 and AN's A 310 and B 320.

One advantage of Differential MF-PDOA may be that, compared to MF-PDOA, it drops the need for any local oscillators; instead, within each PDOA pair for each AN, the two CW's may be multiplied together. Elaborating on Differential MF-PDOA, the CW's with frequencies $f_1$ and $f_2$, transmitted from AN A 310 and received at WTRU (e.g., ZE device) 340, may be shown to be respectively:

$$\alpha_A \cdot \cos\left\{2\pi f_1 \cdot \left(t - t_A - \frac{d_A}{c}\right)\right\} \text{ and } \alpha_A \cdot \cos\left\{2\pi f_2 \cdot \left(t - t_A - \frac{d_A}{c}\right)\right\},$$

where $\alpha_A$ is the total path attenuation (including fading, path loss, and shadowing) between AN A 310 and WTRU (e.g., ZE device) 340; $t_A$ and $d_A$ are, respectively, the delay at AN A 310 (with respect to WTRU 340) and the propagation delay between AN A 310 and WTRU 340. The two CW signals may be multiplied together, and the high-frequency component in the product may be filtered out (see upper left corner of FIG. 4) to produce:

$$K \cdot \cos\left\{2\pi(f_1 - f_2) \cdot \left(t - t_A - \frac{d_A}{c}\right)\right\}$$

Equation 12

The argument of this cosine is the phase difference between the two signals received from AN A:

$$\Delta\phi_{21,A}(t) = 2\pi(f_1 - f_2) \cdot \left(t - t_A - \frac{d_A}{c}\right) \quad \text{Equation 13}$$

Likewise, for a second CW pair 304 ($f_1'$, $f_2'$) with the same frequency difference $\Delta f_{21} = f_2' - f_1'$ transmitted from AN B 320, received at the WTRU 340, multiplied out, and filtered (see right half of FIG. 4):

$$\Delta\phi_{21,B}(t) = 2\pi\Delta f_{21} \cdot \left(t - t_B - \frac{d_B}{c}\right). \quad \text{Equation 14}$$

The change in phase difference (between B and A) is therefore ($\theta_{BA} = \nabla\Delta\phi_{21,BA}$ in FIG. 4):

$$\nabla\Delta\phi_{21,BA} \equiv \Delta\phi_{21,B} - \Delta\phi_{21,A} = 2\pi\Delta f_{21} \cdot \left(t_A - t_B - \frac{d_B - d_A}{c}\right), \quad \text{Equation 15}$$

$$\nabla\Delta\phi_{21,BA} \in [-\pi, \pi),$$

Figure 4:
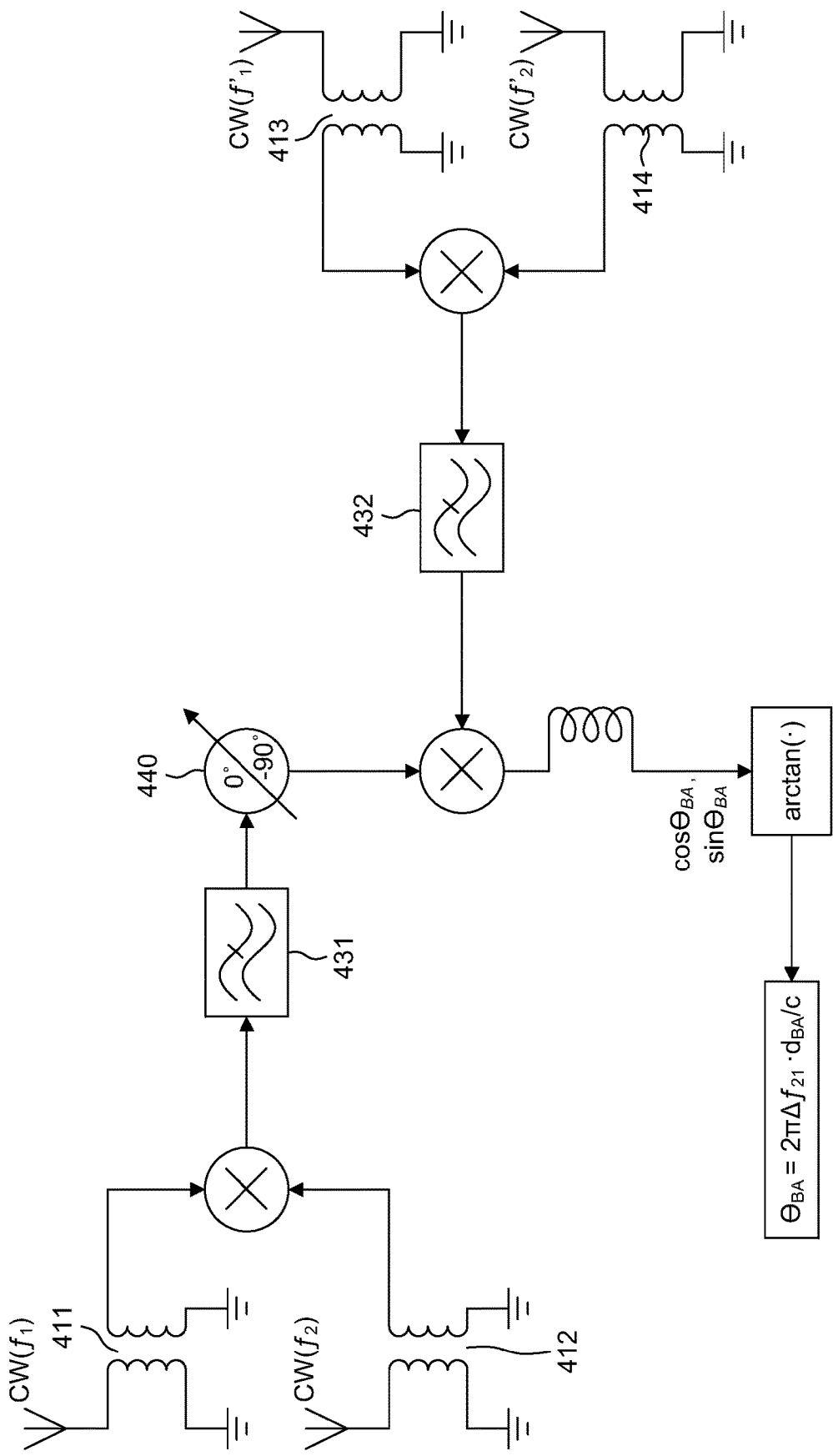
FIG. 4 is a diagram illustrating an example of a ZE receiver to implement differential MD-PDOA measurements for CW at frequency $f_1$ and $f_2$ transmitted from AN A and CW's at frequencies $f_1$ and $f_2$ transmitted from AN B.

The 90-degree phase shift 440 in FIG. 4 results in Eq. 12, but with a sine function instead of a cosine function; ultimately, it may be used to come up with the argument of the cosine/sine by feeding "measurement values" $\sin\theta_{BA}$ and $\cos\theta_{BA}$ to an arctan module. Also, Eq. 15 ranges between $-\pi$ and $\pi$ (rather than between $\pi$ and $2\pi$).

Ensuring time synchronicity between AN's (e.g., $t_A = t_B$), then the differential distance $d_{BA} = d_B - d_A$ may be given by:

$$d_{BA} = \frac{c \cdot \nabla\Delta\phi_{21,BA}}{2\pi \cdot \Delta f_{21}}. \quad \text{Equation 16}$$

Since $d_{BA}$ can be either a positive or negative value (e.g., depending on closer proximity to A or B, respectively), the range may be [$-\pi$ and $\pi$].

Subsequently, the scheme may be applied using another pair of AN's (e.g., A and C). Note that locations with the same phase difference $\nabla\Delta\phi_{21,BA}$ (or differential range $d_{BA}$) trace a hyperbola with foci at AN's A and B. Another hyperbola may then be traced by locations with the same phase difference for signals originating from AN's A and C. The location of the WTRU (e.g., ZE device) may then be determined by the intersection of these two hyperbolas. Such a procedure, described with relation to differential MF-PDOA, may be tantamount to a "hyperbolic positioning" (or hyperbolic trilateration) approach, similar to LORAN-C and OTDOA, but using MF-PDOA.

FIG. 4 is a schematic diagram that shows one way towards implementing Differential MF-PDOA. High-Q MEMS voltage-boosting transformers 411, 412, 413, 414 as shown in the figure may allow narrowband CW's while improving sensitivity; multipliers/mixers multiply the CW's; low-pass filters 431, 432 remove the double-frequency components produced by the multipliers, and so on. Another possibility is to have MEMS transformers with bandwidth wide enough to allow a pair of CW's (for a PDOA), which would half the number of transformers; however, this may reduce sensitivity (e.g., from the lower voltage-boosting and from the thermal noise and interference allowed in by the wider bandwidth).

In some cases, CW's may be radiated from an AN and backscattered off a WTRU to measure PDOAs at the AN.

When measuring PDOA at the AN via backscattering, each CW may propagate over a distance that is double the range d (between the AN and WTRU). When using CW's with frequencies $f_0$ and $f_i$ (frequency difference $\Delta f_i$), if there is no processing delay at the WTRU (e.g., CW is not modulated so there is no need for processing), the observed phase difference $\Delta\phi_i$ may be measured back at the AN and can be shown to be: $\Delta\Phi_i = 4\pi \cdot \Delta f_i \cdot d/c$, which, as Eq. 1, can be rewritten as:

$$\Delta\Phi_i = \Delta\phi_i + 2\pi \cdot m, m \in \mathbb{N} \quad \text{Equation 17}$$

The actual/true range $R_T$ may then be shown to be:

$$R_T = \left\{\frac{\Delta\phi_i}{2\pi} + m\right\} \cdot \frac{c}{2 \cdot \Delta f_i}, \Delta\phi_i \in [0, 2\pi) \quad \text{Equation 18}$$

Recalling from Eq. 3 that:

$$R_T = R_A + m \cdot R_{max,i}, \quad \text{Equation 19}$$

The apparent/measured range $R_A$ and maximum range $R_{max,i}$ respectively become:

$$R_A = \frac{c \cdot \Delta\phi_k}{4\pi \cdot \Delta f}, \quad \text{Equation 20}$$

$$R_{max,i} = \frac{c}{2 \cdot \Delta f_i}.$$

Also, the CRT approaches as discussed herein relating to MF-PDOA (i.e., to increase the maximum unambiguous range for MF-PDOA in the DL) may be applicable to backscattering with no delay.

When there is delay at the WTRU receiver during backscattering, one approach may be to use Differential MF-PDOA in which the differential one-direction range is measured instead in the UL at the AN's A and B (e.g., the backscattered signal may be processed at AN's A and B). It can be shown that (e.g., for one-direction range in the UL):

$$d_{BA} = \frac{c \cdot \nabla\Delta\phi_{21,BA}}{2\pi \cdot \Delta f_{21}}. \quad \text{Equation 21}$$

Expanding the role of ZE devices to include positioning-related measurements may further improve battery life, but their modest electronic capabilities require informing the network of these capabilities and preferred/supported values for Range Bin Resolutions, co-primes, maximum frequency separation supported. Additionally, the modest electronic capabilities require network tailoring the Positioning Reference Signals (PRS) comprising of a set of CW's to facilitate the range estimation at the UE via MF-PDOA.

A ZE device may have limited RF capabilities, and/or it may only support specific values for parameters that define, and specific RF characteristics for signals that are required for, the MF-PDOA positioning scheme. The limited RF capabilities of ZE devices may place an undue burden on the network in terms of the amount of radio resources that it needs to allocate for ULP range measurements.

A procedure is therefore necessary to inform the network of the device capabilities and to aid the network in designing MF-PDOA-based PRS signals that are tailored to the device specifications/capabilities to most properly, in turn, aid the WTRU in determining the range. This procedure may additionally help the network attain efficient radio resource management.

As discussed herein, the RAN segment of the network is termed Access Node (AN), which may refer to, and be interchangeable with, the eNB, gNB, Access Point, Base Station, microcell, microcell, picocell, femtocell, and so on. The AN may support LTE, NR, Wi-Fi, or ULP/ZE communications. Additionally, the AN may be mobile (that is, collocated in a vehicle with a mobile backhaul).

The term may refer not only to the WTRU but may also be refer to an IoT/MTC object, vehicle, and so on.

The term positioning reference signal (PRS) as discussed herein refers to an ensemble of unmodulated continuous waves (ensemble of CW's) radiated by a AN—for the purpose of range estimation via MF-PDOA at the UE. The PRS may be defined per range bin resolution $\Delta r$ value; in such case, to distinguish the PRS resources for each $\Delta r$ value, the term PRS layer (one PRS layer per $\Delta r$ value) is used in this document.

As discussed herein, a phase difference for a given pair of CW's is called PDOA. The DL-based range estimation via MF-PDOA is obtained from the measured PDOAs for all the CW pairs, respective co-prime factors, and range bins.

Additionally, for Differential MF-PDOA, procedures may be necessary for one or more reasons, such as: 1) to discover the facilitators located in the vicinity of the WTRU, the channel characteristics, and the frequencies that are more suitable to improve the position-related measurements; 2) to synchronize the facilitators; 3) to recruit and configure them to transmit the CW pairs at the proper frequencies and with the proper timing so that the WTRU can perform the PDOA measurements; 4) to customize the attributes of the signals and customize the system parameters for each device according to their channel conditions and capabilities to make the PDOA measurements more robust and positioning more accurate; and/or, 5) to provide a framework to enable additional approaches at facilitator and WTRU, such as frequency sweeping and beam sweeping.

In one or more embodiments disclosed herein, a PRS may be always-on (e.g., constantly radiated) or on-demand (e.g., radiated as per request from a WTRU). Additionally, the PRS may have a default/baseline configuration for coarse range estimation or a configuration that is customized with additional, or alternate, CW's and specific characteristics to meet more stringent WTRU requirements (e.g., either to increase robustness against channel impairments or to attain finer range resolution). The requests for a PRS resources may be device- or group-specific based on the WTRU's ULP/ZE hardware and MF-PDOA measurement capabilities. For example, each ULP/ZE modem may refer to an identifier that is unique to a specific set of capabilities. The identifier may then be used to request and determine the suitable PRS resources. It should be understood that the suitability of a particular set of PRS resources can be based on and determined by the WTRU's capabilities and ranging accuracy requirements. The capabilities and ranging accuracy requirements can include the possible frequency pairs and frequency separations that the WTRU can support as well as a range within which the WTRU needs to be from a serving cell. Accordingly, in one example embodiment, a WTRU can have a constraint on the minimum supported frequency separation $\Delta f_{min}$ and may be presented with a PRS resource that includes a set of N frequency pairs with frequency separations $\Delta f_i$ for all i in $\{1, 2, \ldots, N\}$. In this example, the WTRU can discard all frequency pairs that have frequency separations that are smaller than the supported minimum and can then evaluate the maximum unambiguous range supported by the remaining frequency pairs according to Eq. 11. On the condition that the determined maximum range is below the expected serving cell coverage range, the PRS resource can be determined to not be suitable. Should the determined maximum unambiguous range be determined to be above the expected serving cell coverage range, the PRS resource can be determined to be suitable. Thus the suitability of a particular PRS resource can depend on the ranging requirements and parameters as well as the capabilities of a WTRU to which the PRS is sent. It should be understood that if a PRS resource is determined to not be suitable for use by the WTRU, it can request another PRS resource.

A ULP device or ZE device may refer to a hybrid device consisting of a main modem (e.g., supporting NR, LTE, or another existing technology such as Wi-Fi) and a ULP/ZE modem. The phase measurements are performed by the ULP/ZE modem. A ULP or ZE device may be referred to as a type of WTRU, but generally referred to as a device herein unless otherwise specified.

As discussed herein, there may be more than one scheme to determine the range between the device and the AN utilizing only PDOA measurements, such as range estimation utilizing MD-PDOA with on-demand PRS and Hybrid (MF-)PDOA with Path Delay measurement. For illustration purposes only, these schemes may be referred to as a first scheme and a second scheme, respectively. In these schemes, the PRS resources may only be available on demand.

In the first scheme, the PRS resources may comprise of CW's with frequency pairs just sufficient to meet the total (effective) $R_{max}$, such as the minimum number of co-primes are available to meet a desired $R_{max} = \Delta r \cdot \Pi_{i=1}^{i=k} \xi_i$.

In the second scheme, the PRS resources may comprise of CW's that are more than sufficient to meet the desired $R_{max}$. The determined additional pairs may then be used to detect/correct range estimation errors, subsequently, increasing the robustness against channel impairments.

In addition, there may be a variation to either the first scheme or the second scheme whereby a device conveys the PDOA estimates to the network, and the network computes the range.

In the first scheme of MF-PDOA-based range estimation when PRS is available on demand, the AN may not be configured by default to radiate PRS containing the unmodulated continuous waves (CW's); instead, the ULP may send a request to the network to broadcast the PRS. This PRS request may comprise of the following process: step 1) a WTRU transmits a request for PRS to the network; step 2) the network transmits (e.g., broadcasts) the PRS; and/or, if necessary, step 3) the WTRU transmits another request to the network requesting additional PRS. In the initial step of transmitting a request, the request from the WTRU for PRS may contain a list of parameters that fulfill the WTRU's (e.g., a ZE device) RF capabilities and its resolution requirements. This list may comprise of RF and baseband capabilities, such as: Total System Bandwidth $\Delta F$ (e.g., frequency difference between lowest-frequency CW and highest-frequency CW); Lowest CW frequency $f_0$; Minimum Supported Frequency Separation $\Delta f_{min}$ for a pair of CW's; Number of supported simultaneous PDOA measurements (number of phase differences); Minimum delay required between consecutive PDOA measurements; Co-prime numbers supported/requested and highest co-prime value $\{\xi_k\}$; and/or, Phase sensitivity, given as the granularity of the phase or the number of phase values that device may calculate for near-cell, mid-range, cell-edge conditions. There may be other parameters as well, such as Range Bin Resolution Δr desired, which may be one value or a plurality; RSSI observed; mobility status; range accuracy required.

The Δr may not be requested by the WTRU, but the network may make this decision on behalf of the WTRU, and the value may be implicit from the choice of co-primes and frequencies (as in Eq. 8).

In the first step of the first scheme, it may also be possible for the WTRU to explicitly transmit less parameters or alternatively transmit an identifier of a standardized set of parameters. It may also be possible for the WTRU to specify which frequencies and co-prime factors to transmit.

In the third step of the first scheme (e.g., second request), there may be changes in the values of some of the parameters (e.g., with respect to the initial request, e.g., the first step) due to changes in the channel conditions or the range estimation requirements.

When the network transmits the PRS (e.g., the second step), upon receipt of the request with the above parameters, the AN may tailor the PRS as per the requested parameters and start radiating the PRS layer for each Range Bin Resolution. Also, the network may only share with the WTRU the frequencies to use—the network may radiate additional CW's that it is sharing with other devices (e.g., WTRUs).

The frequency pairs may have the following two arrangements: 1) Sequential: The pairs are in the form $\{f_0, f_1\}$, $\{f_1, f_2\}, \ldots, \{f_{k-1}, f_k\}$, where for this this arrangement, the frequencies are monotonically increasing ($f_0 < f_1 < \ldots < f_{k-1} < f_k$). Hence $f_0$ and $f_k$ could be the lower and upper edges of the System Bandwidth; 2) Co-extensive: The pairs are $\{f_0, f_1\}, \{f_0, f_2\}, \{f_0, f_k\}$, where for this arrangement, the $f_0$ is hence present in every pair. In this case, any frequency $f_i$, (i>0), may be the upper edge of the System Bandwidth. As discussed herein, the co-extensive arrangement may be assumed for demonstration purposes.

The values of the co-primes and the frequencies may not need to increase with i (e.g. $\xi_1=8$, $\xi_2=5$, $\xi_3=7$). For finest achievable Range Bin Resolution, a pair i may be set such that $(f_i-f_0)$ corresponds to the largest ΔF; likewise, for largest effective $R_{max}$, the frequency difference $(f_i-f_0)$ for one of the CW pairs is set to the minimum possible frequency separation.

Regarding the transmitting step (e.g., step 1 of the first scheme), in Table 1 and the subsequent paragraph, there are a few examples that illustrate co-prime and frequency selection, and their relationship to range bin resolution and maximum range. Also, the receiver's phase sensitivity is discussed.

TABLE 1

Range bin resolution and maximum effective range for various parameter combinations

| Case | $f_1 - f_0$ (MHz) | $f_2 - f_0$ (MHz) | $\xi_1$ | $\xi_2$ | Δr (meters) | $R_{max, 1}$ (meters) | $R_{max, 2}$ (meters) | $R_{max}$ (meters) |
|---|---|---|---|---|---|---|---|---|
| a) | 12 | 10 | 5 | 6 | 5 | 25 | 30 | 150 |
| b) | 60 | 50 | 5 | 6 | 1 | 5 | 6 | 30 |
| c) | 100 | 87.5 | 7 | 8 | (3/7) | 3 | (24/7) | 24 |
| d) | (100/7) | 12.5 | 7 | 8 | 3 | 21 | 24 | 168 |
| e) | (16/7) | 2 | 7 | 8 | 18.75 | 131.25 | 150 | 1050 |
| f) | (30/7) | 2 | 14 | 15 | 5 | 70 | 75 | 1050 |
| g) | 60 | 56 | 14 | 15 | (5/14) | 5 | (5 + 5/14) | 75 |

The maximum values of the co-primes may be limited by the phase sensitivity of the ULP/ZE receiver: The finer the phase resolution (phase sensitivity), the higher the maximum co-prime possible. The higher the co-primes possible, the larger the value of N in Eq. 6, thus the larger the ratio between the $R_{max}$ and the Δr as in Eq. 10. Also, the wider the frequency separations, the finer the range resolution. In cases f) and g) in Table 1, co-prime values not exceeding 16 may be used as the receiver may reliably discriminate 16 phase values within the range between 0 and 2π (e.g., with a resolution of 2π/16=π/8), which could be thanks to good channel conditions (high RSSI, proximity to AN). Compared to case f), case g) achieves fourteenfold finer resolution using wide frequency separations at the expense of a fourteenfold decrease in maximum achievable range. Cases d) and e) may apply to somewhat worse channel conditions (e.g., midrange, substantial interference), so the resolution of the receiver is π/4; that is, co-primes not exceeding 8 may be used. However, even if a device is experiencing favorable channel conditions, it may not need to request high co-prime values—the device may trade range resolution for additional range reliability. On the other hand, the device may also request different sets of parameters (e.g., different PRS layers) if it lacks any knowledge of the channel conditions or the approximate range. Finally, another point relevant to step 1 of the first scheme is that for narrow frequency separation, particularly close to $\Delta f_{min}$, the ZE modem may experience a reduced phase sensitivity.

Regarding step 2 of the first scheme, when the AN starts radiating the PRS (or PRS layers), the AN may transmit: i) parameters providing the frequency and time characteristics of the PRS and/or ii) information that aids that ULP device make the PDOA measurements. These parameters and information may be: Spectral characteristic, such as system Bandwidth, minimum frequency spacing, co-prime factors—or list of frequencies used; PRS format if set consisting of modulated continuous waves, such as waveform, modulation scheme, bandwidth, transmission duration; Temporal characteristics, such as timing of PRS occasion, duration of PRS occasion, number of consecutive PRS occasions, delay between PRS occasions, total duration of all PRS occasions; and/or, Range Bin Resolution.

A device may receive these PRS resources and the parameters characterizing them and proceeds to obtain the PDOA estimates for each frequency pair and obtain the approximate range. If a device needs to further refine the range estimate, such as narrow the resolution, or the device may not properly determine the range estimate using the existing PRS, then, as per step 3 of the first scheme, the device may again transmit a message with capabilities and resolution requirements; however, to minimize the length of this message, it may be transmitted with a differential format, that is, describing only the changes with respect to the last request: many of the parameters, such as ΔF, $\Delta f_{min}$, $\Delta f_{min}$, do not need to be updated; additionally, some co-primes may not change and so on.

Figure 5:
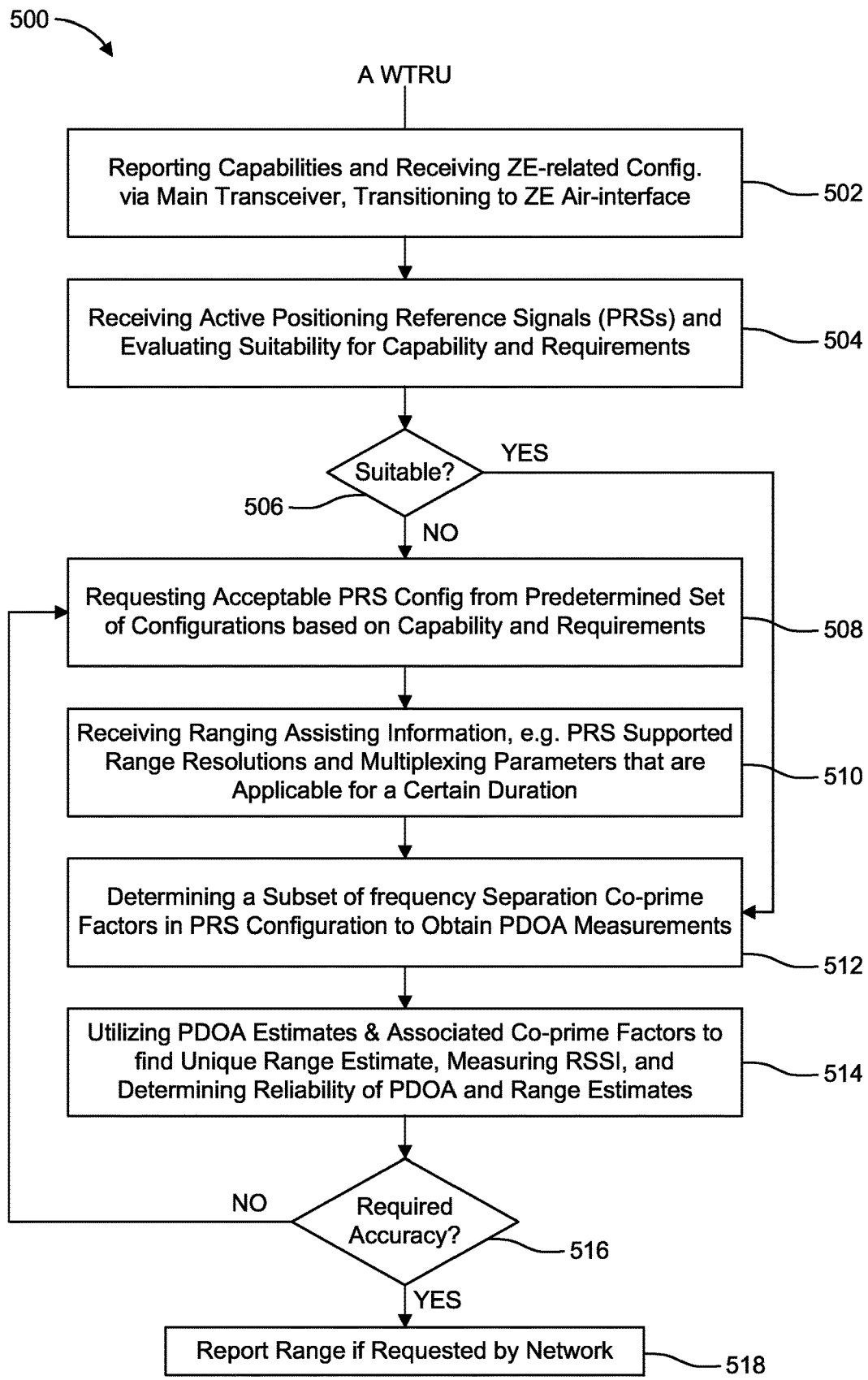
FIG. 5 is a flowchart illustrating a method in accordance with an example embodiment.

Referring to FIG. 5, a method 500 in accordance with one of the embodiments is shown. In one example situation, the method 500 according to the first scheme, at 502, a device (e.g., a WTRU or STA) equipped with a ZE receiver reports its ZE-modem electronic and MF-PDOA-measuring capabilities, along with desired PRS parameters; these parameters may be requested by referring to a particular PRS Set ID. Accordingly, at 502, the device may report its capabilities and receive a ZE-related configuration via its main transceiver and transitions to a ZE air-interface. At 504, the device receives PRS resources from the network along with parameters characterizing the PRS. The active PRSs that the device receives may be ones that have been activated by default or they may be ones that have been activated by other devices. The receipt of the PRS and the parameters permits a determination, at 506, of whether the PRS is suitable for the capabilities and positioning requirements of the device. If, at 506, it is determined that the PRSs and parameters are suitable (i.e., match the capabilities and/or the requirements of the device), the device then, at 512, measures PDOAs for the available frequency pairs and combines them to generate the range estimate at 514. Having obtained the range estimates the device, at 514, can then determine the reliability of the PDOAs and the range estimate. If the device determines, at 516, that one or more PDOAs are unreliable, then the device proceeds to 508, where it makes another request for the same resources via the same PRS Set ID. It should be understood that a request for a PRS resource can be made by a device by reference to a PRS Set ID which refers to the PRS resource and associated parameters being requested or by reference to a device ID that indicates the PRS resources and parameters compatible with the particular device. In other words, the device can include a PRS Set ID or a device ID in the request to request a specific set of PRS resources. If the device performs request process at 508, the device, at 510, again receives the PRS resources and, at 512, measures the PDOAs and makes an estimation of the range at 514. If the device determines, at 516, that the reliability of the PDOAs and range estimates are sufficiently accurate, it can then, at 518, report the range or positioning to the network. The device may not need to convey its capabilities and desired PRS parameters as they have not changed. The device has the option to combine the new PDOA measurements with those from the second step. If the new range is very similar to the range computed in the second step (a difference of one range bin resolution), then the device may take the average of the two.

The ZE-receiver equipped device may use one or more of the following parameters to report, at 502, its electronic and MF-PDOA-measuring capabilities: Lowest and highest frequency supported for the CW's, where this information may be represented in the form of a lowest CW frequency $f_0$ and Total System Bandwidth $\Delta F$; Minimum frequency separation for any pair of CW's, where additionally, whether there is any minimum difference between any frequencies of all the CW's present at any time; Support for sequential or co-extensive frequency pair arrangements or both; Number of CW pairs or CW's that it may process simultaneously (the CW's are processed in a PRS occasion), where if a co-extensive arrangement is used, N PDOAs may be measured via N+1 CW's, and if a sequential arrangement is used, N PDOAs may be measured via 2·N pairs; Minimum delay supported between consecutive PRS occasions; and/or, Range of co-prime values supported.

The PRS parameters desired are as per channel conditions: phase sensitivity and RSSI observed; maximum co-prime; and/or, range bin resolution, range accuracy, and/or desired maximum effective range.

The PRS Set ID referring to standardized sets of electronic capabilities and measurement capabilities (and may include generic desired PRS parameters) may be acquired during the Attach (LTE) or Registration (NR) procedure, or SIB message broadcasts or broadcast to ZE devices.

The PRS parameters the network transmits, at 504 or 510, along with the PRS resources may contain: Frequency pair arrangement, such as sequential or co-extensive; PRS occasions, duration of PRS occasions, number of consecutive PRS occasion, and/or delay between PRS occasion; and/or, Resolution Range Bin, frequencies used, and respective co-primes per PRS occasion.

At 516, a device may determine that reliability of the PDOA values via calculation of a function (e.g., average, max, min, . . . etc.) of RSSI values over all pairs. The device may determine that average corresponds to three ranges: Near Cell (Strong RSSI), where PDOA measurements are reliable; Mid-Range (Average RSSI), where a retransmission of PRS resources is necessary to verify PDOA measurements; and/or, Near-Edge (Poor RSSI), where multiple (e.g., at least three) PRS retransmissions are necessary. The PDOAs may be averaged across the values obtained in the transmission and retransmissions.

The reliability of the PDOA values may be inferred by determining the variation of the PDOAs within the range bin that is common to all the frequency pairs, and also the proximity of any PDOA to the lower or upper limit of the range bin.

In an alternate example situation of the first scheme, a device equipped with a ZE receiver may, at 502, report its capabilities, along with desired PRS parameters explicitly or via a particular PRS Set ID as in the previous example. Then it may receive, at 504, the PRS resources and parameters characterizing them as in the previous embodiment, and proceeds to measure the PDOAs at 512, but alternatively, due to poor RSSI, the device determines, at 516, that it needs a different set of parameters to increase robustness against channel impairments. In this situation the device, at 508, makes a request referring to a different PRS Set ID or a request containing a differential format, providing only the parameters that have changed. Then, the device utilizes the updated PRS resources to perform PDOA measurements at 512 and range estimation at 514.

In some cases range estimates and location(s) may be determined in the network. With the objective of keeping the ZE/ULP device modem design as simple and power efficient as possible, an alternate approach is to transfer the PDOA measurements to the network, and the network may process the PDOA values to determine the range. The measurement values may be provided to the network in a quantized format (e.g., integer+ fractional part).

In some instances, the end goal may be positioning, rather than just simply ranging. For positioning, the ranges along with the coordinates of each AN radiating the PRS need to be known.

The network may, at the end of the PRS transmission from one AN, begin a scheduled PRS transmission from a different AN (e.g., the device providing now a new set of PDOA measurements). The cycle (e.g., which may comprise of PRS transmitted, PDOA measured, and reported to the network, and the network calculating the range) may be repeated at least three times until the location of the ULP device is determined.

In some instances, there may also be no need for the absolute position but the relative position or relative distance to as little as two AN's located along a track, route, or even a mall. In a mall, for instance, end users may simply need to know the minutes on foot they are away from a department store, or steps calculated. On a running track, athletes may need to know how far along the running track they have made it rather than the exact coordinates. The network accordingly may direct PRS resources to be transmitted from two or more AN's.

In the second scheme there may be a multiplicity of PDOAs to increase robustness against noise. In this arrangement, additional pairs of CW's are offered, and the respective additional PDOAs for different frequencies are measured, to hedge against noise, rather than to increment the range; that is, more PDOAs may be measured for any determinate effective $R_{max}$ with the purpose of making the range estimation more reliable.

A device may leverage the additional PDOA(s) in one or more approaches. In a first approach for leveraging the additional PDOA(s), a given number of PDOAs may be necessary to determine unambiguously a range ("essential PDOAs"); one additional PDOA (e.g., for a different frequency pair) may be provided as a check. If the value calculated by the additional PDOA is not consistent with the range obtained from the essential PDOAs, then the device may request retransmission of the same PRS resources or a change in the requested PRS parameters. One option is to combine the values calculated in the first transmission with those in the retransmissions (e.g., to average out the phase noise).

In a second approach for leveraging the additional PDOA(s), a multiplicity of additional PDOAs may be provided (in addition to the "essential PDOAs"); a device may follow an election rule whereby if a certain number of PDOAs (e.g., a number greater the number of "essential PDOAs") agree, then it may be determined that the measurement is reliable. An alternate rule may be to ignore the differing PDOA if it does not significantly impact the range (e.g., it results in the overall range being one range bin away).

In a third approach for leveraging the additional PDOA(s), multiple sets of "essential PDOAS" are provided, each one independently capable of determining the range. These two sets may have same, similar, or different values for $\Delta r$ and $R_{max}$. If the two computed ranges disagree, the number of mismatching PDOAs may be determined. If it is only one mismatching PDOA, it may be ignored, and the range may be estimated using the remaining PDOAs. If there are two mismatching PDOAs, but the two ranges computed for the two sets are similar, then an average may be estimated. Also, an election rule may be followed.

Figure 6:
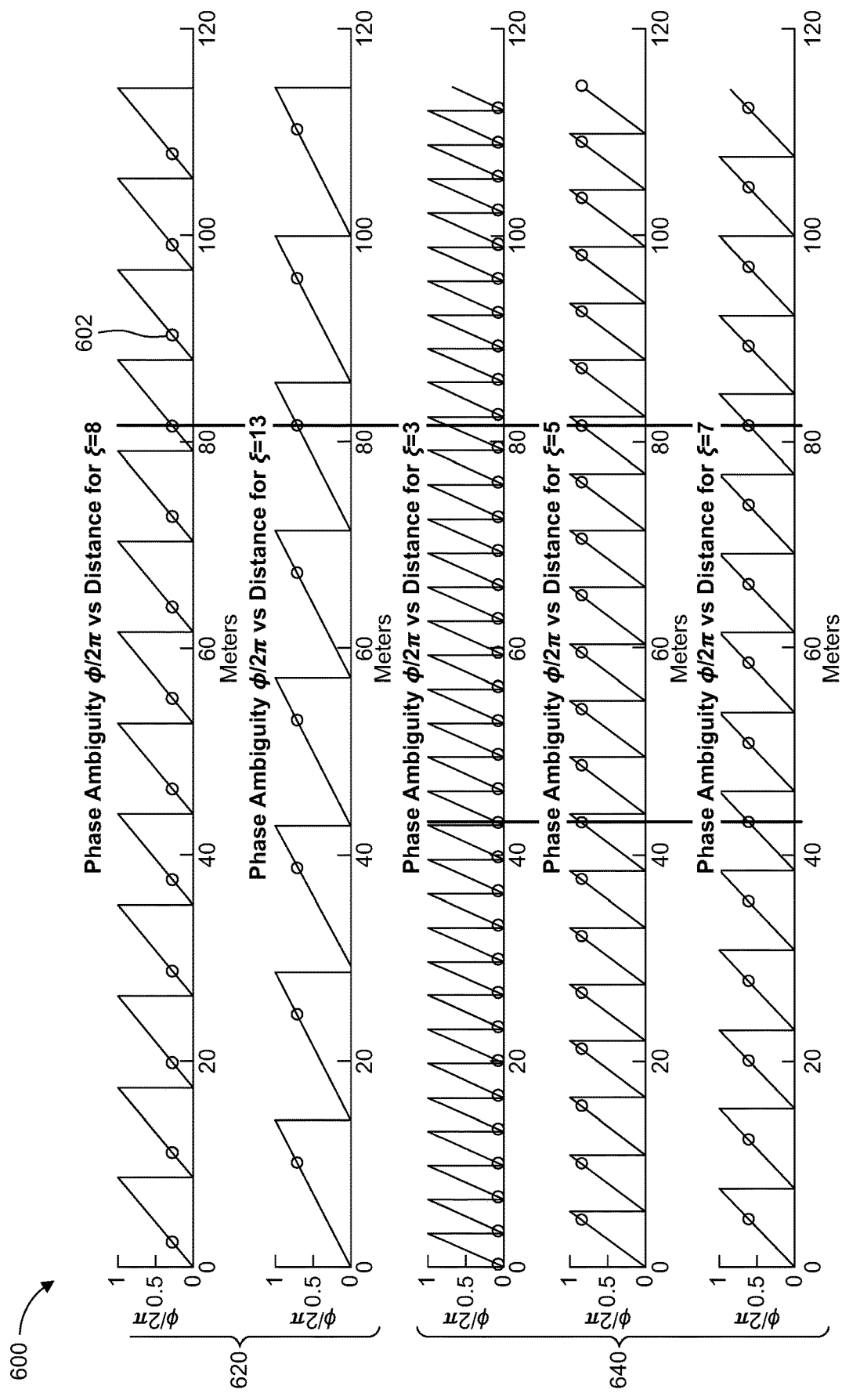
FIG. 6 is a diagram illustrating an example of PDOAs estimated for two essential sets.

One example to the third approach of the second scheme in FIG. 6. Consider the following sets, each one of which may determine the correct range for approximately 105 m: Essential Set #1: $\{\xi_1=8, \xi_2=13, \Delta f_1=34.125, \Delta f_2=21$ MHz$\}$ 620 and Essential Set #2: $\{\xi_3=3, \xi_4=5, \xi_5=7, \Delta f_3=91$ MHz, $\Delta f_4=54.6$ MHz, $\Delta f_5=39$ MHz$\}$ 640. The $\Delta r=100$ m/(7·13)= 1.099 m and the respective $R_{max}$ for set 1 and set 2 are 104·$\Delta r$ and 105·$\Delta r$. The choice of $\Delta r$ was such that it allowed frequency differences that were multiples of 100 KHz (set 2) and 125 KHz (set 1).

FIG. 6 is a diagram 600 illustrating an example of PDOAs estimated for two essential sets 620, 640. As shown, the PDOAs may be seen changing with different periodicity; this periodicity is given by $\xi_i \cdot \Delta r$, which is the $R_{max,i}$. For instance, for $\xi_1=8$, the periodicity is 8.792 m, which covers the variation of phase between 0 and 2·π. Within this period, there are $\xi_1=8$ range bins. The phase measured for each $\xi_i$ corresponds to various range bins (e.g., the circles 602, which repeat within for the same $\xi_i$ with periodicity of $R_{max,i}$); the objective may be to find range bins that contain circles 602 for all $\xi_i$.

In the example of FIG. 6, the true range is supposed to 81.6 m; however, because of an error in the PDOA for $\xi_3=3$ (phase measured resulted in a different bin), then the bottom set ($\xi_3=3, \xi_4=5, \xi_5=7$) picks a range of 43.13 m (line on the left). The top set ($\xi_1=8, \xi_2=13$) correctly selects 81.6 m. Notice, however, that the PDOAs for $\xi_4$ and $\xi_5$ have one range bin that agrees with the PDOAs for $\xi_1$ and $\xi_2$; this leads to $\xi_3$ being rejected. The range is picked using these four PDOAs, so the estimated range is 81.6 m. Also notice that a more straightforward way to select the range estimate is to apply a majority rule, such as to find the range bin where the majority of the PDOAs agree.

Referring again to FIG. 5, in one example situation, at 502, a ZE-modem-equipped device reports its ZE-modem electronic capabilities and MF-PDOA-measuring capabilities, along with PRS parameters that include the necessary pairs N ("essential" pairs) to determine the range, and PRS parameters containing M "redundant" pairs of frequencies (called redundant because these pairs together result in $R_{max}$ that is not sufficiently long). At 504, the device receives the PRS resources from the network along with the parameters characterizing the PRS for both the essential pairs and the M redundant pairs. Note that the received PRS parameters might be different than the requested ones based on the devices currently served by the network. Then, the device measures, at 512, the PDOAs using the essential pairs to obtain an "essential" range and calculates the PDOAs for the redundant pairs. At 514, the device checks if the essential and redundant pairs are all in agreement, where there are selected range bins for each of the redundant pairs that are consistent with the "essential range", the estimated range is declared valid at 516, and the estimation is completed at 518. Otherwise, if essential and redundant pairs are in disagreement, where there is no unique range bin that matches across all pairs, then the device considers majority ruling to determine, at 514, the validity of the range estimate. Subsequently, the device checks if at least J range bins (J<M+N) are matching, and the device selects the range bin that matches across the J range bins to determine the final range estimate at 514. The parameter J may be determined by the device or provided by the network. Alternatively, the device utilizes the (M+N−J) differing range bin(s) to determine a range estimate and checks if it is close to the range estimate determined by the majority J, then a weighted average of all M+N selected range bins may be used to calculate the range estimate at 514. On the condition that less than J range bins are matching, then the device repeats the procedure where it again requests, at 508, the same or different PRS resources and may utilize the resulting measurements and estimates independently or combined with previous ones.

In another example situation, at 502, a ZE-equipped device reports its ZE-modem electronic capabilities and MF-PDOA-measuring capabilities, along with PRS parameters requesting two sets of "essential" pairs, each essential pairs set being sufficient to determine the range on its own. At 504, the device receives the PRS resources from the network for both essential pairs along with the parameters characterizing the PRS for both essential pairs. Note that the received PRS parameters might be different than the requested ones based on the devices currently served by the network. The device then calculates PDOAs, at 512, and computes the range estimates, at 514, for these two essential pairs sets. If the ranges estimates agree, the measurement is declared completed. If the ranges disagree, but only one PDOA is inconsistent, election rule is applied, and the range is estimated using the remaining PDOAs (e.g., a range bin is selected such that it matches across all pairs except the differing pair). If two PDOAs do not match with the rest, but the difference in the resulting estimated ranges is insignificant or tolerable, the device may declare the range estimate as the average of the two. Otherwise, the device repeats the procedure where it again requests, at 508, the same or different PRS resources and may utilize the resulting measurements and estimates independently or combined with previous ones.

In a supplemental arrangement, PRS-related information may be exchanged during Attach/Registration procedures. In the previous schemes, updating the network with the WTRU capabilities on one hand and informing the WTRU regarding the PRS characteristics on the other may be onerous to a ULP/ZE device, in the UL or DL.

In the UL of a ULP/ZE device, transmission may occur via an ordinary RF transmission or via UL backscattering (of a signal from the network); the former requires consuming the modest energy available to the ULP/ZE device (e.g., collected via energy harvesting). Backscattering may offer low data rates and make the UL communications for the ULP/ZE device totally dependent on the network. With either technique, it may be preferable to avoid large data transfer.

In the DL of a ULP/ZE device, the modem may have a narrow bandwidth, thus limiting the data rates. Moreover, processing the incoming data incurs in power consumption.

In contrast, as the main modem (i.e., LTE and NR) has no such data rate limitations, it may be used to advance part of the procedures to be able to measure the PDOAs—before the device goes into ZE mode.

One alternative is to determine i) the capabilities and needs of the device and ii) the associated PRS characteristics whenever: the main-modem is in the initial phase of the communication (the registration after radio-on); the device moves to a Tracking Area outside its registration area; and/or, there is a change in WTRU capabilities (end-user toggles "support for ULP/ZE mode"). These procedures may be conveniently used to convey the information required for MF-PDOA operation.

The capabilities and needs of the device, and the associated PRS characteristics information then does not have to be exchanged during the periodic tracking area update (e.g., periodic registration update in NR) as they should already be available/stored in the network.

Figure 7:
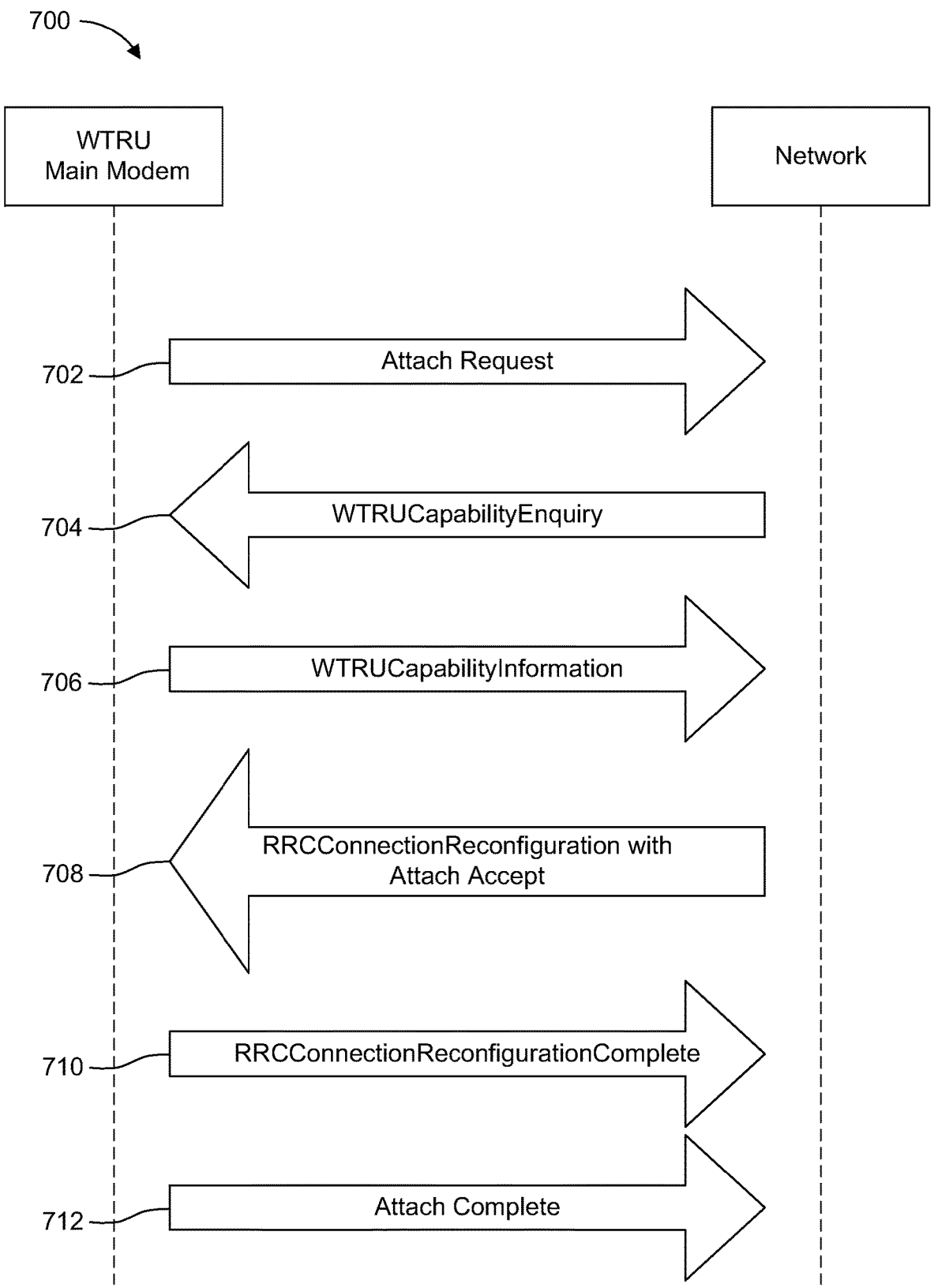
FIG. 7 is a diagram illustrating an example of PRS-related information exchange during an Attach procedure.

FIG. 7 is a diagram illustrating a PRS-related information exchange during Attach procedure 700. Generally, for the Attach procedure 700, one or more of the following steps may occur. Initially, there is an Attach Request (LTE) or Registration Request (NR) message 702, which may contain a "ULP/ZE bit" informing the device that the device supports ULP/ZE mode/modem (and ULP/ZE positioning). Next, there may be a WTRU Capability Enquiry message query (e.g., UECapabilityEnquiry) 704 for ZE/ULP capabilities, along with the queries for EUTRA, EUTRA-NR, and NR. Next, the WTRU Capability Information message 706 may contain information elements (IEs) detailing the ZE/ULP positioning supported technologies (MF-PDOA) and respective RF and Baseband capabilities (e.g., co-primes, system BW, and so on) along with desired values for positioning parameters (e.g., resolution). Next, there may be a RRC Connection Reconfiguration (LTE) or RRC Reconfiguration (NR) message 708 that contains IEs characterizing the PRS (e.g., actual frequencies, co-prime factors, timing data, and so on). Next, the device may respond with an RRC Connection Reconfiguration Complete/Reject message (LTE) or with an RRC Reconfiguration Complete/Reject (NR) 710. Finally, there may be an Attach Complete message 712 from the WTRU main modem to the network.

In the RRC connection reconfiguration complete message 710, the network may specify if the PRS resources are i) always-on, ii) available on demand, and/or iii) intermittent following a certain pattern. Additionally, the network may specify the PRS resources for various AN's so as to be able to calculate multiple ranges. The PRS parameters specified in this message might be for a default PRS layer which might be reconfigured at the WTRU periodically or at a change of a registration, tracking, or RAN notification area. The configuration might also be provided as mapping between identifiers and sets of parameters, one set for each supported PRS layer.

Additionally, the RRC Connection Reconfiguration (LTE) or RRC Reconfiguration (NR) message 708 may contain sets of different PRS resources. When the device goes into ULP/ZE mode, it may choose one of those sets depending on the channel conditions and location (e.g., outdoors, mall). Additionally, if none of the sets in the Reconfiguration message 708 is applicable to the channel conditions and locations, the device may request the resources just as outlined in the first and second scheme as described herein.

As discussed herein, there may be schemes that relate to hybrid (MF-)PDOA with path delay measurement. Specifically, these schemes may combine PDOA measurements with timing information. When the actual range of a device to the AN is larger than the $R_{max,i}$ for a determinate pair of CW's used, aliasing may occur. This aliasing may be modelled by m (see Eq. 3): the PDOA may not unequivocally determine the true range.

Calculating PDOAs for multiple pairs may increase the effective $R_{max}$, but this value may still be limited, where there may still be aliasing when the actual range exceeds the effective $R_{max}$.

In addition, even if the true range is known to be less than the effective $R_{max}$, there may be errors in the measurement of PDOAs resulting in incorrect range bin decisions; even if for one PDOA, it is simply selecting the immediate neighboring range bin, then this may result in large errors in the computed range. The remedies include extending the length of time over which the PDOAs are measured, using more pairs than necessary to unequivocally determine the range, and/or repeating the PRS and the respective measurements.

One alternative is to combine the PDOA measurements with round-trip-time (RTT) data such as Timing Advance (TA) and Time-of-Flight (ToF): The PDOA measurements provide the accuracy, while the round-trip-time data removes the ambiguity (e.g., thus extending the effective $R_{max}$ to a value that may be the radius of the cell served by the AN). If using only one CW pair, the $R_{max,i}$ may be made larger than the resolution of the RTT.

In addition, for multiple pairs, the RTT timing data may act as a form of redundancy that may help detect errors when, due to adverse channel conditions, one wrong bin decision puts the MF-PDOA range estimation in conflict with the RTT estimate: For instance, referring to Eq. 5, $\xi_1=3$, $\xi_2=5$. The true value of d is 14, so the mod values (measured) for d are supposed to be $a_1=\mod(14,3)=2$ and $a_2=\mod(14,5)=4$. However, due to phase error, the values measured above are 1 and 4. The computed value of d becomes 4 instead as $\mod(4,3)=1$ and $\mod(4,5)=4$.

As discussed, combining PDOA with RTT measurements may improve the maximum range and accuracy, increases versatility, and enhances the robustness against channel impairments.

In one instance, there may be a hybrid (MF-)PDOA-TA scheme, where there may be technique(s) for how UL and DL synchronization in LTE and NR is attained.

Upon power-on, a device may first seek system acquisition and DL synchronization via the PSS and SSS synchronization reference signals; this synchronization may be at the received frame, subframe, slot, and/or symbol level, and may allow reading the broadcast system messages. Then, after determining the RACH parameters from the system messages, the device may attempt the RACH procedure, which, among other things, may achieve UL synchronization.

UL synchronization may be achieved where a device first transmits RACH MSG1 in the UL in accordance to the timing of the received DL signals; however, there may be a $t_d$ delay (e.g., equal to range/c) between the transmitted frame (e.g., at the AN) and the received frame (e.g., at the device). The UL signal, initially in sync with the received frames, may be received at the AN with an additional $t_d$ propagation delay. The network may determine this RTT=$2 \cdot t_d$ delay when the device sends the first RACH MSG1, and the network may respond in the RACH MSG2 with a TA command, which is expressed in multiples of $16 \cdot T_s$ in LTE. Given that the value of $T_s$ (e.g., sampling period, i.e., the basic unit in LTE) is defined as $1/(2048 \cdot 15$ KHz$)=1/30720$ ms and accounting for RTT, the TA command may correspond to a range granularity of 78.125 m. It may be assumed that the accuracy of the TA command is also 78.125 m, that is, the TA command specifies the locations $78.125 \cdot n \pm 39.0625$ m. In other words, except for the origin, for which TA would be 0, the size of the TA range bin ($\Delta r_{TA}$) is 78.125 m.

In NR, that subcarrier spacing (SCS) is in the form $2\mu \cdot 15$ KHz. The TA command granularity may be the same as for LTE but divided by $2\mu$: the timing TA commands may be in multiples of $64 \cdot 16 \cdot Tc/2\mu$, where Tc=$1/(4096 \cdot 480$ KHz$)$ =$64 \cdot Ts$. For SCS of 15 KHz, $\mu=0$, so the range granularity may be the same as for LTE; however, for SCS of 30 KHz, $\mu=1$, the range granularity may be then 39.0625 m, and so on. As the LTE/NR device moves around, the network may subsequently send TA updates (e.g., small differential values) to maintain the device's UL timing aligned with the network. The network, in any case, may know the total Timing Advance at any moment.

As part of the ULP/ZE device requests for PRS, it may include a request for TA. Another option is that the network automatically provides a Timing Advance. In both cases, the device may combine the TA with the PDOA measurements.

Depending on channel conditions, range values, and supported frequencies, the device may have various PDOA+TA combination options, such as one PDOA+TA, MF-PDOA+TA, and/or, TA to detect MF-PDOA errors.

For the one PDOA+TA option, a PDOA frequency pair may be chosen so that the $R_{max,i}$ is slightly larger than $\Delta r_{TA}$. The PDOA measurement may provide better resolution than TA, while the TA removes the range ambiguity.

Figure 8:
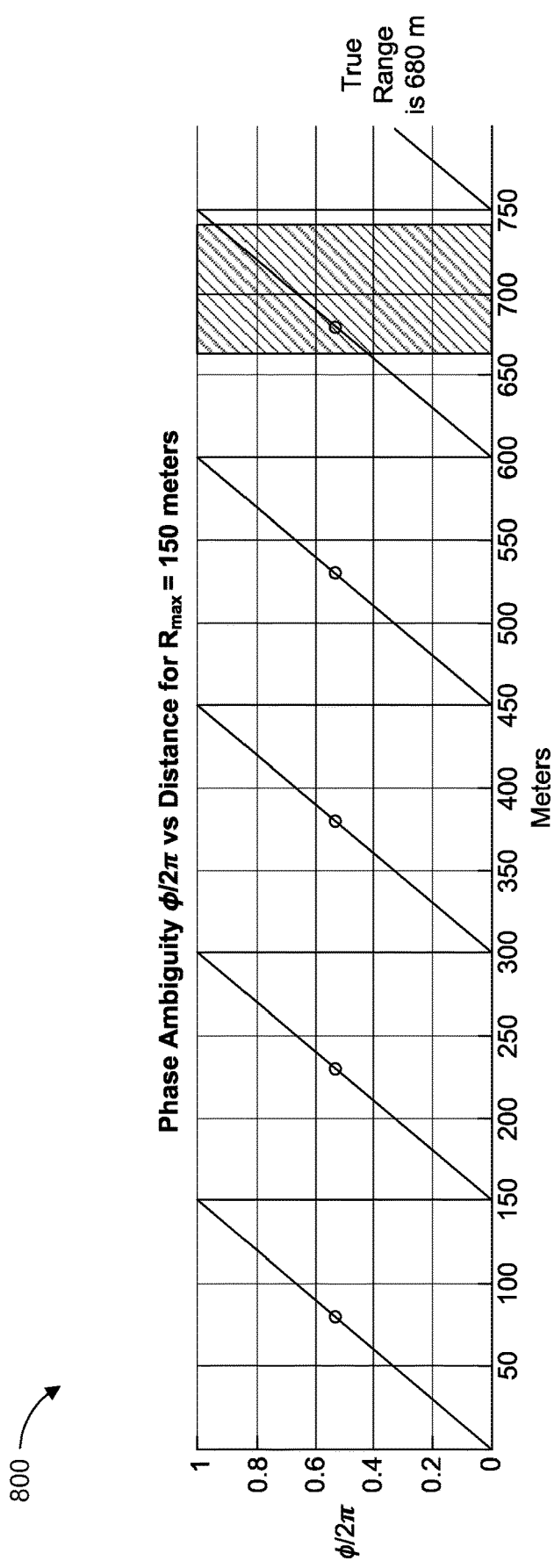
FIG. 8 is a graph illustrating an example of phase ambiguity.

FIG. 8 is a graph 800 that illustrates an example of phase ambiguity. In this figure measuring the PDOA results in possible ranges of $80+150 \cdot m$ meters. The TA data determines that range is approximately between 664 and 772 m, therefore m is 4, and the range is computed to be 680 m. In the figure, the circles 802 mark the possible ranges determined from the PDOA measurements, while the TA data selects the correct circle mark.

The actual range precision in this situation may depend on the phase sensitivity; if a device may differentiate phases by $\pi/8$, that implies the precision here is approximately 10 m, that is, $150/(16$ phase values$)$, and the range is around $680 \pm 5$ m.

For the MF-PDOA+TA option, multiple PDOA frequency pairs may be combined with the TA; the effective $R_{max}$ is chosen to be somewhat larger than $\Delta r_{TA}$. Resolution that is finer than in the MF-PDOA+TA option may be obtained, while the TA removes the redundancy. For instance, for a device supporting phase resolution of $\pi/8$, the following values are requested: $\xi_1=4$, $\xi_2=15$, $f_1-f_0=50$ MHz, $f_2-f_0=13.333$ MHz, $\Delta r=1.5$ m.

The effective $R_{max}$ of MF-PDOA is 90 m. Hence, a device using this combination of parameters may then offer a maximum range determined by TA (cell radius); also, at good values of RSSI (e.g., as in proximity to the AN), the device may offer a range resolution of 1.5 m.

Alternatively, the device can request the following: $\xi_1=3$, $\xi_2=5$, $\xi_3=8$, $\Delta r=1$ m, $f_1-f_0=100$ MHz, $f_2-f_0=60$ MHz, $f_3-f_0=37.5$ MHz.

The effective $R_{max}$ of MF-PDOA is 120 m. The range resolution is 1 m. Using a maximum co-prime value of 8 ensures that $\Delta r$ occupies no less than $\pi/4$ in PDOA estimation. Therefore, with these parameters, the device may be able to withstand poorer values of RSSI than in the previous example.

Referring again to FIG. 5, in one example situation, at 502, a device equipped with a ZE receiver reports its ZE-modem electronic and MF-PDOA-measuring capabilities, requests a Timing Advance and PRS parameters whose maximum effective range is slightly larger than the resolution of the Timing Advance. At 504, the device receives the PRS resources, the parameters characterizing the PRS resources, and the Timing Advance. The device then computes the PDOAs, at 512, and combines them to come up with the range estimate at 514: The TA determines a coarse range bucket, while the PDOAs provide finer range resolution within the TA range bucket.

In a variation to the previous example situation, the device receives a TA value from the serving AN which is subsequently used to determine an initial range estimate and a corresponding expected RSSI. Subsequently, the device utilizes the determined RSSI value and initial range estimate to select and request, at 508, a specific PRS configuration that improves accuracy while providing robustness. The maximum effective range of the PRS requested may be i) somewhat larger than the resolution of the Timing Advance or ii) unrelated to the resolution of the Timing Advance. Then, the device receives, at 510, the PRS resources from the network along with parameters characterizing the PRS resources. Device then measures, at 512, the PDOAs for the available frequency pairs. For case i) a device measures the PDOAs and combines them to come up with the range estimate at 514: The TA determines a coarse range bucket, while the PDOAs provide finer range resolution within the TA range bucket. For case ii), a device computes the PDOAs and determines the range estimate, only using the TA to verify this range estimate at 514.

Figure 9:
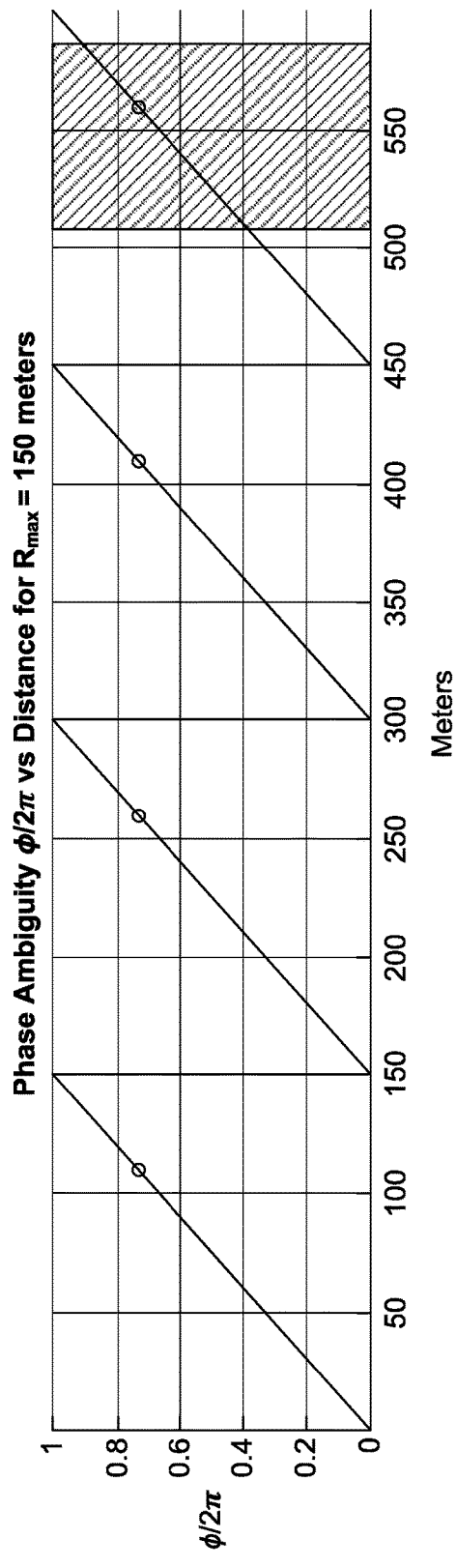
FIG. 9 is a graph illustrating an example of TA used for validating results from MF-PDOA.
Figure 9:
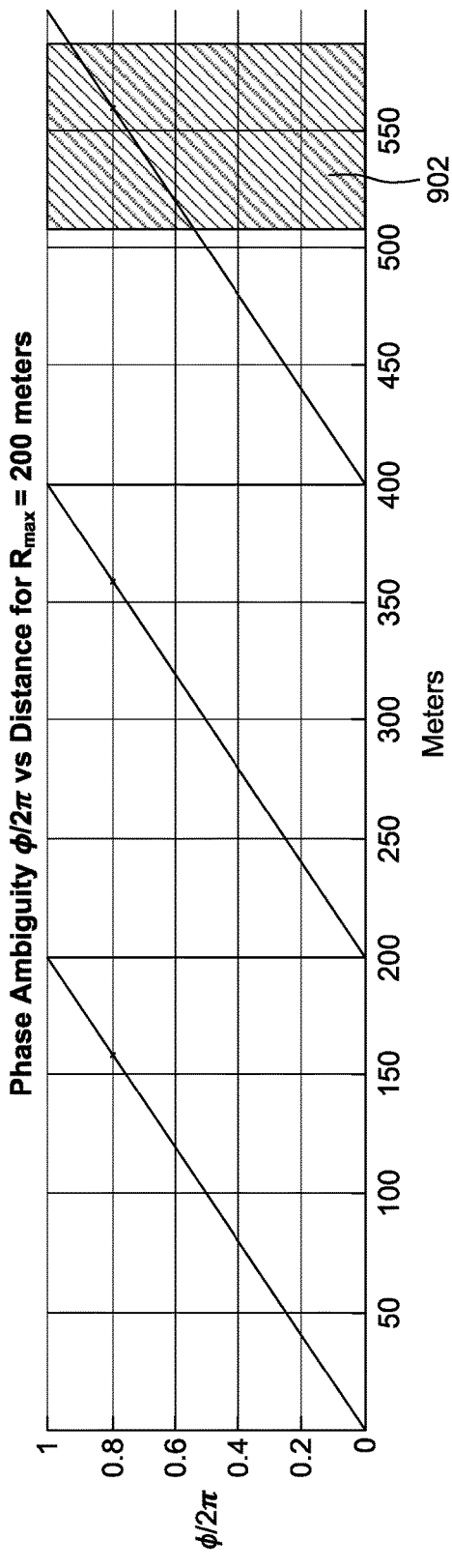

For the option where the TA is used to detect M F-PDOA errors, the role of the TA is to validate and check the results obtained via MD-PDOA. FIG. 9 shows two graphs that illustrate an example 900 where TA is used to validate results from MF-PDOA. In the figure, the overall range computed for PDOAs using $\xi_1=3$ and $\xi_2=4$, $\Delta r=50$ m is around 560 m, which coincides with the TA range bin selected 902.

Finally, it may be possible, just as in the first scheme, to report the PDOA measurements to the network, and the network makes the range and positioning calculations. In such a case, the network may not need to share the TA value.

Figure 10:
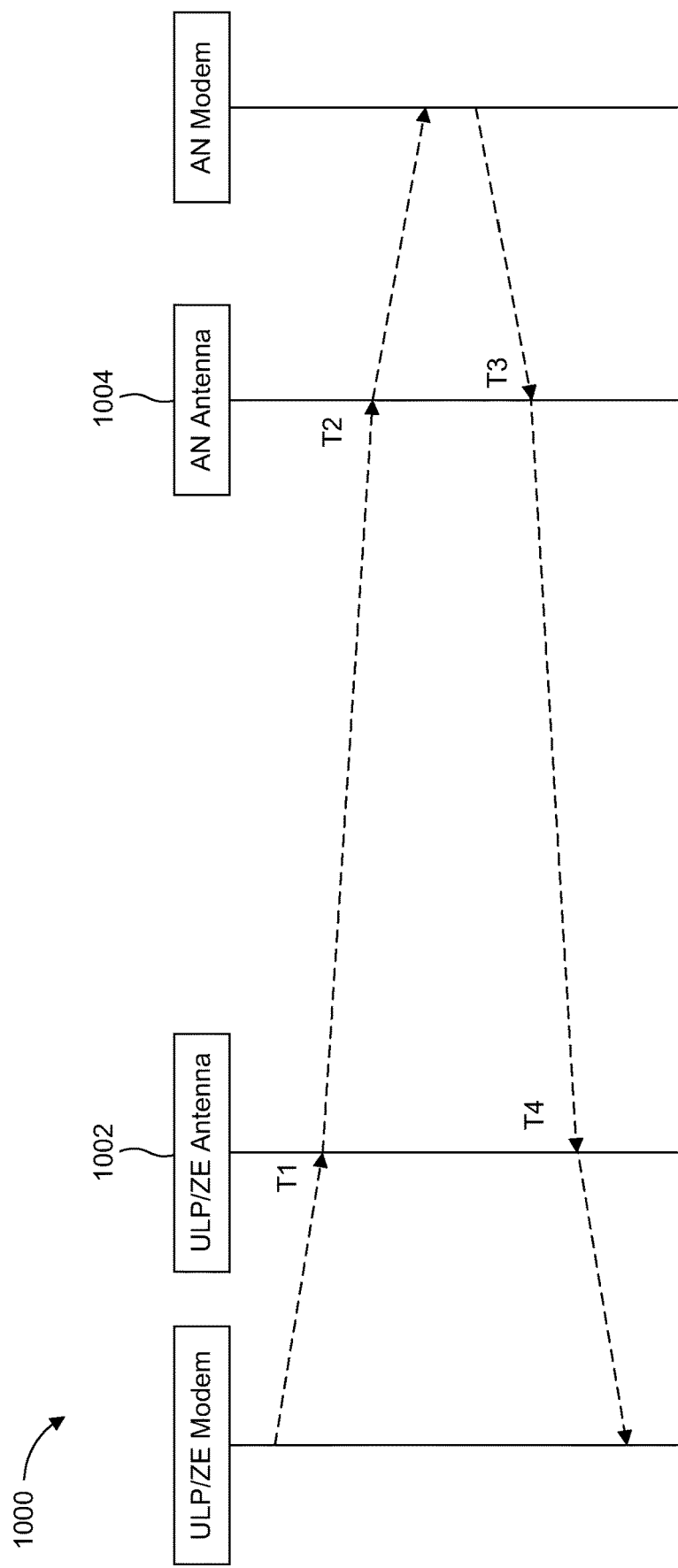
FIG. 10 is a diagram illustrating an example of timestamps for a ULP/ZE transmission.

In one instance, there may be a hybrid (MF-)PDOA-ToF scheme. Time-of-Flight (ToF) methods calculate the round-trip-time (RTT) of signals transmitted in one direction and receive the response in the opposite direction; they may also account for the processing of the received signal, that is, measuring the processing delay. FIG. 10 is a diagram illustrating an example the use of timestamps in a hybrid PDOA-ToF scheme 1000. In the figure, the timestamps T1 and T4 correspond to the instants the signal respectively leaves and arrives the ULP/ZE antenna 1002. On the other hand, timestamps T2 and T3 correspond to the instants the signal respectively arrives at and leaves the AN antenna 1004.

The RTT of the signal over the air is RTToF=(T4−T1)−(T3−T2). The range is therefore $$\frac{c \cdot RTToF}{2}.$$

As the accuracy of the range obtained via RTToF may be better than that of the TA scheme described herein, it may allow the use of co-primes, frequencies, and range bin values that differ from those requested with the TA scheme (e.g., to improve on the performance of PDOA alone). For instance, if ToF alone allows accuracies of 5 m, and the device supports phase accuracies of π/8, then PDOA values with $f_1-f_0$=60 MHz to achieve $R_{max,i}$=5 m and a resolution of 0.625 m.

The timestamps of FIG. 10 may be calculated when the WTRU transmits the requests for PRS resources, and the network responds with the PRS resources and their characteristics. Parameters T2 and T3, or alternatively quantity T3−T2, may be included with the message containing the characteristics of the PRS resources. If the device provides the PDOAs for the network to make the range estimates, the device may need to transmit the values of T1 and T4, or alternatively quantity T4−T1, along the PDOAs.

Alternatively, if the requests for PRS resources are made via backscattering, the network may determine the timestamps of the backscattering signal leaving the AN antenna and the backscattered signal being received at the AN antenna. The device may determine the instant the signal arrives at the antenna and the instant the transmitted response leaves the antenna to measure the processing delay. If the network makes the range estimates, the device may provide the PDOAs along with the processing delay.

In some cases, range estimation may utilize MF-PDOA with legacy CRS and TRS. Specifically, LTE and NR references signals may be used instead of, or in conjunction with, MF-PDOA PRS to obtain multiple PDOAs for range estimation.

For MF-PDOA via CRS in LTE, the Cell-Specific Reference Signal (CRS) is an always-on, since it is an essential component of LTE and used for Radio Resource Management (e.g., Selection, Reselection, Handover), Channel State Information measurements, Frequency-Domain Equalization and Digital Automatic Gain Control, Frequency and Time Tracking, and Data Demodulation.

On the other hand, due to the scarcity of unused sub-6 GHz spectrum, NR may be sharing spectrum with LTE via a scheme called Dual-Spectrum Sharing (DSS). DSS requires that data intended for NR devices be rate-matched around always-on LTE signals. As a result, an NR device may be able to detect the CRS in every NR subframe.

In one approach, the CRS may be a resource for DL-based ranging/positioning via MF-PDOA as follows.

The CRS is comprised of subcarrier signals that are present in every Resource Block (RB) throughout the system bandwidth. If the eNB is using one port, there are two CRS subcarriers per RB, each located 90 KHz apart from the other. Hence, the frequency separation of the subcarriers used for CRS for one port may be expressed in the form 90·n KHz, where n is {1 ... 2 $N_{RB}$−1}, where $N_{RB}$ is the number of resource blocks in the system bandwidth.

The CRS is only modulated with a predetermined length-31 pseudorandom Gold sequence c(n) that a device may generate. For then defined as above, the in-phase and quadrature sequences are respectively given by $$\frac{1}{\sqrt{2}}(1 - 2 \cdot c(2n)) \text{ and } \frac{1}{\sqrt{2}}(1 - 2 \cdot c(2n+1)).$$

The minimum separation between signals that a device supports for MF-PDOA positioning is $\Delta f_{min}$, which may limit the frequency combinations that may be used.

Assuming the device supports a minimum separation $\Delta f_{min}$=2 MHz; the system bandwidth ΔF is 20 MHz, hence $N_{RB}$=100; using $\Delta f_i$ values that are multiple of 1.8 MHz (10 RBs), either set of parameters as follows may be selected, and the $R_{max}$ obtained is 166.67 m (see Eq. 11) in both cases:
a) $\xi_1$=5, $\xi_2$=3, $f_1-f_0$=5.4 MHz, $f_2-f_0$=9 MHz, Δr=11.11 m;
b) $\xi_1$=5, $\xi_2$=8, $f_1-f_0$=14.4 MHz, $f_2-f_0$=9 MHz, Δr=4.167 m.

Using $\Delta f_i$ values that are multiple of 0.54 MHz (3 RBs), either set below results in $R_{max}$=555 m: c) $\xi_1$=7, $\xi_2$=8, $f_1-f_0$=4.32 MHz, $f_2-f_0$=3.78 MHz, Δr=9.92 m. d) $\xi_1$=15, $\xi_2$=14, $f_1-f_0$=7.56 MHz, $f_2-f_0$=8.1 MHz, Δr=2.65 m.

Cases c and d may be used when devices support a phase sensitivity of π/4 and π/8, respectively. Alternatively, the CRS may be used in tandem with MF-PDOA requested from the network to increase the number of PDOAs via different frequency pairs. Also, the CRS may be used in conjunction with RTT timing.

In the case of 2 ports, which is a common configuration for 2×2 MIMO, there are four subcarriers per RB, each subcarrier 45 KHz apart; however the subcarriers belonging to two different ports may be assumed to belong to different antennas; therefore, only pairs of subcarriers chosen from within the same port may be used, and thus the available frequency differences remain as above.

The MF-PDOA range estimates obtained from the CRS may not be reliable as those obtained from on-demand PRS resources: The CRS frequencies may not match the hardware capabilities of the device so the PDOAs measured may be prone to error. One example is PDOA measurements that may be polluted by reference signals that could not be properly removed by the Band-Pass filters in the device.

For MF-PDOA via TRS in NR, the TRS is a type of reference signal that uses the CSI-RS resources to allow finetime tracking and frequency tracking at the device. The TRS is not always on; it is transmitted only along with PDSCH data. However, using the process reservation, the network may arbitrarily carve out the PDSCH channel to allow it to be "future-proof". Thus, using reservation, dummy/empty data may be sent along with the TRS.

The TRS may have 3 subcarriers per RB per port in two consecutive slots, where each TRS subcarrier located 4 subcarriers apart, which for SCS of 15 and 30 KHz, corresponds to 60 and 120 KHz apart respectively. However, unlike CRS, which may be present in every LTE RB, the periodicity for TRS is at least 10 ms. In resume, 3 subcarriers for every RB may be available at least every 10 ms to do MF-PDOA measurements. The minimum number of RBs for TRS is 52. If it is assumed that the SCS is 15 KHz, the minimum number of RBs are used for TRS, then the frequency differences available for MF-PDOA are in the form 60·n KHz, where n is {1 ... (3·52=156)−1}.

Referring again to FIG. 5, in one example situation, initially at 512, the device calculates PDOA values for pairs of subcarriers in the CRS or TRS present in the serving AN, and the device uses these PDOAs to come up with an initial range estimate at 514. This range estimate is likely to not be determined to be reliable, at 516, as it generally may not correspond to the hardware capabilities of the device, but the device may use it in combination with RSSI values for a more targeted/accurate request of PRS resources at 508. Therefore, at 508, the device utilizes the initial estimate to request from the network a specific, customized PRS configuration that is consistent with the initial range estimate. At 510, the device receives the PRS resources from the network along with the characteristics of the PRS. The device then measures, at 512, the PDOAs to determine the range at 514. If there is consistency with the initial range, the range estimation is declared completed and may be reported to the network at 518. Otherwise, if the estimated range disagrees with the initial estimate at 516, the device may proceed to 508 where it requests PRS resources again with the same or different parameters. The device then compares the new range estimate with the previous range estimate.

In a Differential MF-PDOA scheme, there may be configurations and data transfer that take place i) between a WTRU (e.g., ZE WTRU) and AN and ii) between facilitators (e.g., other WTRUs) and AN. Pairs of CW's for multiple AN's and differences in frequencies may be used to calculate the differential range between pairs of AN's—and from there, the position of the WTRU.

Since PDOA was previously defined as "phase difference for a given pair of CW's", the differential MF-PDOA scheme may comprise of obtaining the PDOA for multiple AN's (e.g., to obtain a differential range between two AN's at a time) and for multiple frequency differences (e.g., to increase the maximum unambiguous value for this differential range). However, instead of AN's, in examples discussed herein relating to a baseline differential MF-PDOA and sidelink-supported differential MF-PDOA, facilitators or other WTRU's (in the proximity of a ZE WTRU) may be used to generate the CW's. That is, nearby facilitators may radiate the CW's that WTRUs need to obtain the PDOAs: in some cases, facilitators in the proximity of the WTRU may be preferable to AN's since many WTRUs may not be able to detect more than one AN or may not be able to use CW's from more than one AN to obtain PDOAs. Additionally/alternatively, this may be done by means of ANs instead of WTRUs and/or facilitators.

The steps to achieve the differential range comprise of 1) transmission of single CW's for facilitator discovery and resource selection, 2) facilitator synchronization, and 3) transmission of pairs of CW's (e.g., one pair of CW per facilitator) for Differential MF-PDOA measurement. The order of actions 1) and 2) may be flipped as the facilitator synchronization only needs to precede action 3).

Figure 11:
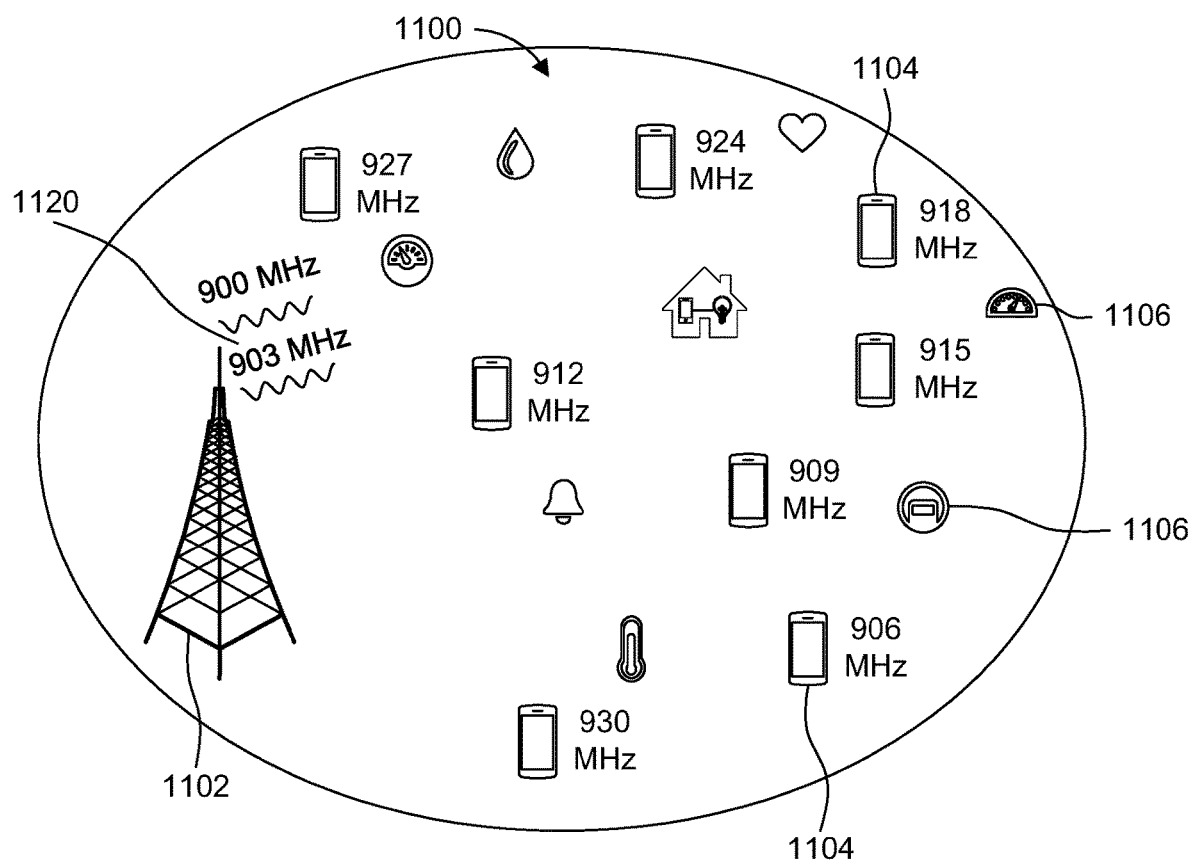
FIG. 11 is a diagram illustrating an example of an AN and select facilitators radiate CW's.

A network 1100 including an AN 1102 and a select set of facilitators radiating CWs is shown in FIG. 11. During the facilitator discovery and resource selection stage (which may be referred to as facilitator discovery as discussed herein), each facilitator (e.g., cellphone-like icons) 1104 may transmit CW's 1120 at a predetermined frequencies, and any ZE WTRU (IoT icons) 1106 detects the CW's with the intention of finding facilitators 1104 in good channel conditions (e.g., between a facilitator 1104 and a ZE device 1106)—channel conditions including path loss/proximity to ZE WTRU 1106, shadowing, fading—and to determine the frequencies (and possibly other parameters) resulting in best channel conditions.

One example approach is for ZE WTRUs 1106 to detect facilitators 1104 radiating at unique fixed frequencies (as in the FIG. 11) and then rank those detected according to their RSSI. Some facilitators 1104 near a target ZE WTRU 1106 may likely not be detected by the ZE WTRU 1106 simply because their signal may "fade out" at the frequencies selected for their CW's: one remedy is to have the facilitators 1104 transmit CW's at multiple frequencies. Then, more complex approaches—if facilitators 1104 can step or sweep through frequencies—can entail RSSI measurements per facilitator and frequency.

Facilitator synchronization may be achieved from 1) at least two reference CW's ("CW-RS") transmitted from the AN 1102 and 2) each facilitator's 1104 knowledge of its respective distance to the AN 1102 (and possibly the position of the facilitator 1104). For instance, the AN 1102 can radiate CW-RS signals at 900 and 903 MHz, which then may be used—via frequency synthesizers (e.g., utilizing frequency multipliers and mixers)—to generate CW's at frequencies 903+3 m MHz (m∈ℕ) at the facilitators 1104; next, each CW may be phase shifted according to the propagation delay between AN 1102 and facilitator 1104, such as $-\mod(d_A/c, 2\pi)$.

Alternatively, facilitator synchronization may be achieved in one of the following ways (A-D) or a combination thereof: A) The AN 1102 transmitting timing advance commands containing values with a time accuracy of the LTE/NR sampling period (e.g., $T_s=1/30.48$ MHz for LTE); however, this timing advance may be for one-way distance (e.g., rather than two-way distance in LTE/NR) to ensure that facilitator 1104 signals are transmitted at the same time (e.g., rather than arriving at the AN at the same time as in LTE/NR). B) A high-bandwidth PRS signal for 5G WTRU's. C) GPS positioning. D) Time-Sensitive Networking (TSN) as part NR Release 16 support for Industrial IoT (IIoT) and URLLC.

Details on the Differential MF-PDOA measurement stage are discussed further herein.

Generally, examples discussed herein relating to a baseline differential MF-PDOA and sidelink-supported differential MF-PDOA may amount to using Differential MF-PDOA for positioning where the resources and configuration used for the calculation of the position are dynamic—they are dynamically selected to exploit best possible channel conditions to optimize the estimation of the position.

Figure 12:
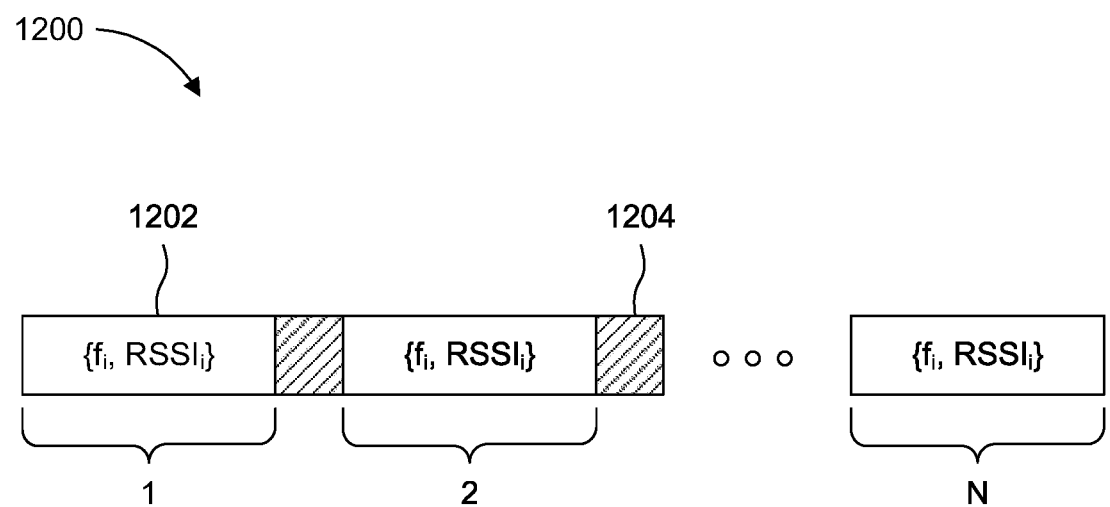
FIG. 12 is a diagram illustrating an example frequency report shared with the AN.
Figure 13:
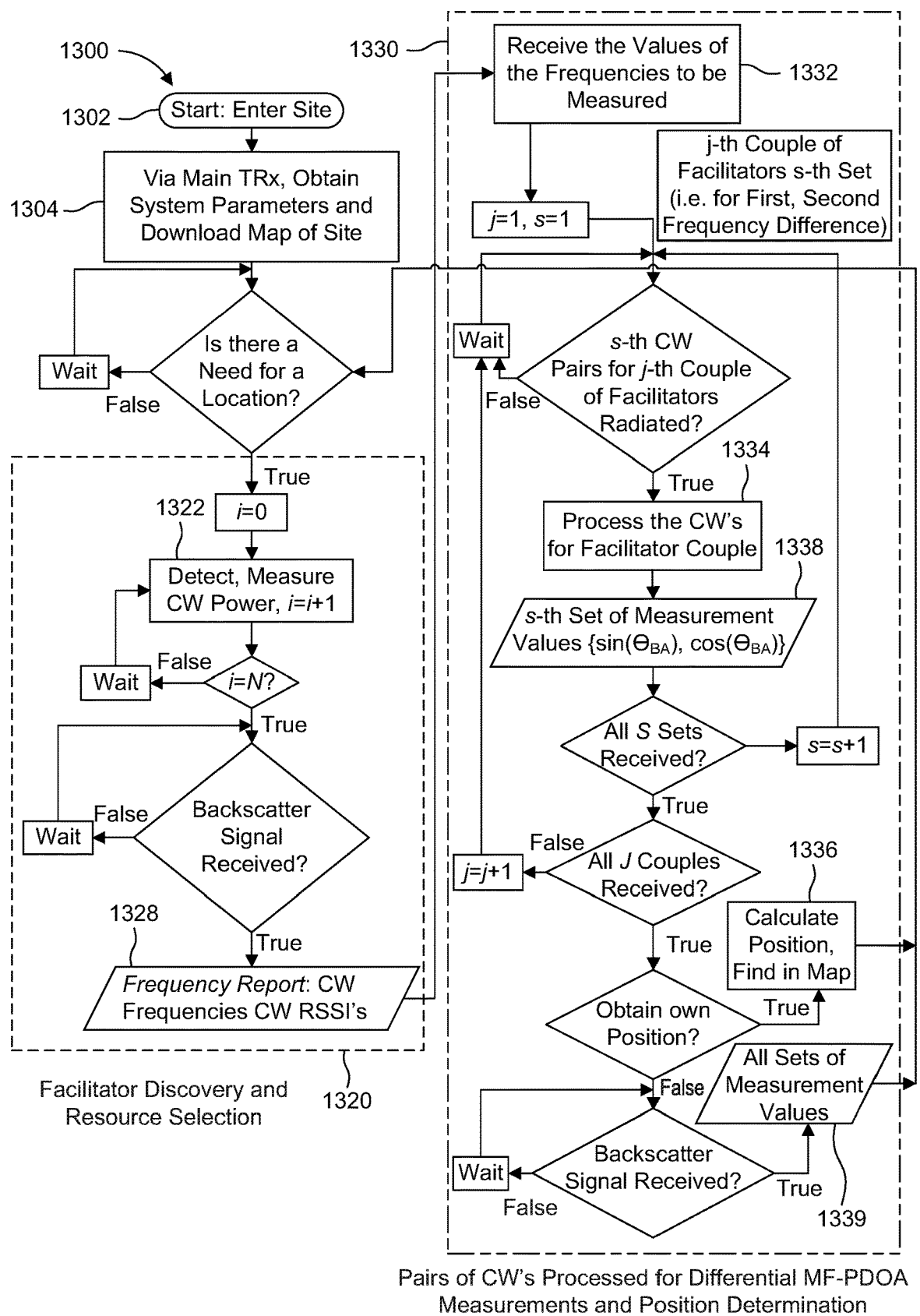
FIG. 13 is a flowchart illustrating an example of semi-static resources/configurations algorithm for differential MF-PDOA scheme.

The facilitator discovery stage 1320, shown in FIG. 13, for this scheme may follow a periodic approach wherein every time period $T_p$, all facilitators in a cell simultaneously transmit one CW each for a duration $T_1$—each facilitator using a different frequency for the CW, the first of N frequencies at its disposal. Then, any ZE WTRU in the area whose position needs to be determined (e.g., by the AN or ZE WTRU itself) reports 1328 to the AN the frequencies that it detects 1322 during $T_1$ along with the RSSI for each frequency. There may be a configuration whereby a ZE WTRU reports 1328 the frequencies only when the RSSI is above or equal to a fixed threshold $P_d$. Upon receipt 1332 of these frequency reports 1200 (illustrated in FIG. 12), the AN may trace back the reported frequencies to the actual facilitators—thus avoiding the need for ZE WTRUs to report any facilitator identities. After a pause, or a time gap, to receive reports from ZE WTRUs and complete the processing 1334 of the measurement reports at the AN, the facilitators may then simultaneously transmit CW's for a duration $T_1$ using the second of the N frequencies. Again, the ZE WTRUs in question may report 1328 the frequencies that they are able to detect along with RSSI values. There is a total of N such iterations (e.g., cycles) until all the N frequencies are cycled through. The system may be set to a minimum of N=3 from the understanding that each facilitator needs to support at least two pairs of CW's (for two frequency differences $\Delta f_i$) during the Differential MF-PDOA measurement stage 1330 (one frequency can be reused in the second pair). Alternatively, the N=3 values may correspond to a low, a middle, and a high frequency within a band/sub-band; ultimately, the more values, the better as frequency points with deep fade can be avoided, and frequency points with optimal fading characteristics selected.

Another alternative is to simply relax the overall procedure to allow N=1 or N=2 and select the facilitators that can be detected whether they are detected or not at those N frequencies (not detected despite their proximity to ZE WTRU because of the CW at frequency transmitted being in deep fade). Such a procedure (e.g., N=1 or N=2) may be viable when there is a high density of facilitators in the entire cell (or in the vicinity of the ZE WTRU in question).

Frequency reports 1200, containing a list with frequencies and RSSIs, may be backscattered to the AN after completion of each one or all of the N iterations.

When listing all N iterations, the frequency report may contain an iteration field 1202 containing each of the detected frequencies (and also the respective RSSI expressed as a margin exceeding the threshold) for each one of the N iterations; each iteration field may be followed by an empty field 1204, except for the Nth field.

If the total number of frequencies listed in the report 1200 fall below a certain target, the AN may direct the facilitators to repeat the N-cycle facilitator transmission procedure and the ZE WTRU to re-measure with a given lower threshold. From the frequency report 1200, the AN may determine the neighborhood where the device is located, so it may direct a subset of facilitators that are only in the ZE WTRU's neighborhood to participate in the repeat of the facilitator discovery procedure 1320 (rather than the whole cell). Alternatively, the AN may skip the repeat, but then include the CW-RS in the Differential MF-PDOA measurement stage 1330.

Upon processing 1334 the frequency reports 1200, the AN may select the facilitators that will transmit the pairs of CW's in the Differential MF-PDOA measurement stage and inform the facilitators and the ZE WTRU of the selection along with the frequencies that will be used. At this point, the AN may start the transmission of its CW-RS; these CW references may be used by the facilitators (along with the knowledge of their range to the AN) to synthesize CW's that are synchronized to the AN. The AN may also notify each ZE WTRU of the couple of pairs of frequencies that will be used (and the identity of the facilitator if ultimately the ZE WTRU calculates 1336 its own position or it traces measurements to a map of the venue, and hence does not report the position to the AN).

Subsequently, each facilitator selected by the AN to participate in the Differential MF-PDOA measurement stage may transmit its respective first pair of CW's. The ZE WTRU may use a pair of CW's from two different facilitators (a total of four CW's) to obtain a first set (set s=1) of measurement values 1338 (sin $\theta_{BA}$ and cos $\theta_{BA}$ in FIG. 4). The AN may then instruct the facilitators to each transmit the second pair of CW's (with another frequency difference), from which the ZE WTRU obtains the second set (set s=2) of measurement values 1338.

The previous procedure may be repeated to obtain a first and second set of measurement values 1338 for a new couple U-th couple) of facilitators.

The ZE WTRU may report 1339 the first and second set of measurement values 1338 for the two (j=2) pairs of facilitators to the AN via backscattering; the AN may then determine the differential range between the first pair of facilitators, then the differential range between the second pair of facilitators. The two differential ranges may be used to determine 1336 the 2-D location of the device. These two pairs of facilitators may or may not reuse one facilitator, where reuse or not respectively results in a total of three facilitators (as in facilitators A and B for first pair, then A and C for second pair) or four facilitators (facilitators A and B, then facilitators C and D). For a 3-D location, measurement values from three couples (j=3) of facilitators are required.

Alternatively, the ZE WTRU may look up the measurement values, along with the identification of the facilitators on a map of the venue the device is at, such as a mall, inside of a hospital, high-rise building, stadium, and so on. The map may be downloaded 1304 beforehand using the main transceiver associated with the ZE WTRU (e.g., when the ZE WTRU first enters the venue). The ZE WTRU may obtain the coordinates from the map and report them to the AN.

In lieu of solely using facilitators, WTRU's (or a combination of WTRU's and facilitators) may also be leveraged in the determination of 2-D or 3-D locations. Additionally, during the facilitator discovery stage 1320, the WTRU's can transmit modulated carriers, such as LTE or NR resource blocks in the UL; the transmissions may convey control-plane data (e.g., Tracking Area Update) and/or small user-plane data (e.g., battery information, the current position, and flag indicating willingness to participate in the Differential MF-PDOA scheme).

Furthermore, instead of a periodic approach, the ZE WTRU itself, via backscattering, may request the start of a Differential MF-PDOA procedure on demand. Rather than having persistent periodic CW resources, these resources may be offered in a semi-persistent manner: on a per-need basis (at the NW or ZE WTRU), the CW resources for the facilitator discovery stage (and their configurations, such as periodicity) may be activated and deactivated.

In one embodiment 1300, a WTRU may be equipped with a main transceiver and a companion ZE receiver (which may referred to herein as a ZE WTRU) containing a bank of fixed-frequency MEMS transformers, a bank of tunable MEMS transformers, or a bank of tunable and fixed-frequency MEMS transformers. When in operation, this ZE WTRU may permanently listen for CW's using the bank of MEMS transformers. This ZE WTRU may also contain Energy Detect (ED) circuits, mixers, low-pass filters, arc tangent modules, and other components. Initially, as a ZE WTRU first enters a venue at 1302, it may download, at 1304, a map of the venue containing also the location of facilitators; the ZE WTRU may also receive the system parameters and share its capabilities. At 1322, whenever the CW's are transmitted, the ZE WTRU may detect the CW's via the ED circuits. If the ZE WTRU needs to determine its position or if it is prompted by the AN to determine its position, then the ZE WTRU may backscatter 1328 the values of the frequencies it is able to detect (e.g., each frequency belonging to a different facilitator) along with the respective RSSI values. The actions at 1322 and 1328 may be repeated a total of N times, where N is a known preconfigured system parameter. At 1328, the ZE WTRU may backscatter a frequency report containing the frequencies and RSSI values for all the N steps. At 1332, the ZE WTRU may be informed by the AN of the frequencies of the CW's with the identities of the facilitators that transmit the CW's (e.g., for all pairs or one pair of facilitators). At 1334, a ZE WTRU may listen to the CW's for a time $T_M$, calculate the PDOAs for a couple of pairs of CW's (e.g., each pair having the same frequency difference $\Delta f_s$, with s=1, and belonging to a different facilitator) and obtain a first set (s=1) of measurement values 1338 ("in-phase" value $\cos \theta_{BA}$ and "quadrature value" $\sin \theta_{BA}$); the ZE WTRU may also share 1339 the measurement values 1338 with the AN via backscattering. Thereafter, the ZE WTRU may repeat the action at 1332, where it is informed of new CW frequencies and related facilitator identities; alternatively, the frequencies from the first set 1338 may be reused but the order may be changed resulting in a new frequency difference $\Delta f_s$ (with s=2); this can be done via first and third frequencies of the first set going to the first facilitator and so on. Then, the ZE WTRU may repeat the action at 1334 for the new CW's and obtain a second set (s=2) of measurement values 1338 for the same pair of facilitators; if the AN requests them, the ZE WTRU may provide the second set of measurement values 1338. The actions at 1332, 1334, and 1339 may be repeated for a new pair of facilitators. The ZE WTRU may alternatively trace the first and second set of measurement values 1338 for the first and second pair of facilitators to a location in the downloaded map and share the associated coordinates with the AN.

In another embodiment, a facilitator may be equipped with transmitters capable of radiating CW's at any of N frequencies. These CW's may be offered in 1) a persistent, periodic manner or in 2) semi-persistent manner (e.g., on a per-need basis resource configurations being activated and deactivated). In a first step, the facilitators (e.g., other WTRUs relative to a ZE WTRU or WTRU in question) may receive commands from the AN to transmit a CW at the first of N frequencies—alternatively, every duration $T_p$, the facilitator may prepare to start transmitting CW's. In a second step, the facilitator may transmit the CW at the assigned frequency for a duration $T_1$. The facilitator may repeat the second step a total of N−1 times. At a third step, the facilitator may be informed of the pair of CW's that it needs to transmit. At a fourth step, the facilitator may transmit the pair of CW's for a duration $T_M$. The third and fourth steps may be repeated at least once for different frequencies and different frequency differences.

In another embodiment, in a first step an Access Node (AN) may order the facilitators in its cell area to start transmitting CW's at the first of their N frequencies (e.g., in a persistent, periodic manner or in semi-persistent, per-need manner). In a second step, the AN may order any ZE WTRUs to report the frequencies it is able to detect. The first and second steps may be repeated a total of N−1 times. In a third step, the AN may process the reports for each ZE WTRU. In fourth step the AN may order the facilitators to transmit at a given frequencies (e.g., with given frequency differences) for a $T_M$ duration; the AN may prompt any ZE WTRU to report the measurements made. The fourth step may repeat the third step for new frequencies (e.g., with new frequency differences). The third and fourth step may be repeated with new frequencies and new frequency differences; from the perspective of the ZE WTRU, a different pair of facilitators may be involved; however, from the perspective of the AN, the same facilitators do the transmissions, but the AN may ensure that the transmissions are now intended for different ZE WTRUs. In a fifth step, using the measurement reports, the AN may calculate the position of any device or it may order the device to report coordinates of its position.

The ZE WTRU may request partial or complete resources with attributes that supplement or replace those in the default resources as disclosed herein. By complete resources, it is meant that the resources are sufficient to obtain the 2-D (or 3-D) location; by partial resources, it is meant that the resources only supplement the default resources. The attributes/resources that can change regarding the discovery stage include the frequencies, total number of frequencies, and/or, the threshold for measurement reporting; regarding the Differential MF-PDOA stage, the attributes/resources that can change are the number of frequency pairs, the frequencies of the CW's and their frequency difference, and/or the duration of the CW's.

In one embodiment, a ZE WTRU that has already received the default resources to discover facilitator and/or to determine its own position may request additional resources that include: different threshold for measurement reporting; additional pairs of CW's; non-default frequency differences $\Delta f_i$ (e.g. large values, or multiples of fractions of 1 MHz); for each facilitator couple, additional couple of CW pairs (using an additional $\Delta f_i$) to refine range or to further increase unambiguous range; non-default frequencies, possibly even in other bands or in guard bands; increased duration of the CW's; multiple couples of pairs of CW's at once (e.g., device is able to obtain measurements for more than two facilitators at once, such as provide measurements for more than one differential range at once).

Using backscattering to transmit requests, detection/discovery results, and measurement results from the ZE WTRU to an AN may impose issues regarding range, reliability, data rate, congestion/contention, and latency. On the other hand, direct communication between the ZE WTRU and neighbor facilitators may be more robust and versatile, more likely to result in less contention, and have less latency. Moreover, direct ZE WTRU-facilitator communications may help reduce the burden to the AN; more importantly, it may make it possible to have a more dynamic and customized per-ZE-WTRU approach to facilitator, frequency, and other parameter selection to ultimately optimize the differential MF-PDOA measurement. Additionally, facilitators may be able to discover the ZE WTRUs prior to the facilitator discovery stage.

In some scenarios, there may be direct communications between the ZE WTRU and facilitators/WTRU's to select the best CW pairs, share the configurations/parameters, and improve and share the Differential MF-PDOA measurements. The direct communications may include backscattering in the UL, sidelink (as in D2D/ProSe and C-V2X) in the DL/UL, a ZE air interface in the DL similar tod that used in 802.11ba, or any combination thereof. As discussed herein, pairs of CW's for multiple AN's and differences in frequencies of $\Delta f_i$ may be used to ultimately calculate the differential ranges and the position of the ZE WTRU.

On the other hand, for indoor environments in general, the channel is impacted by multipath (LOS and/or reflections), and the PDOAs obtained from CW's are hence affected by multipath. A CW transmitted over a multipath channel may result in a net CW with an effective amplitude, or fading amplitude, and an effective delay (e.g., delay that is the sum of 1) the LOS propagation delay (i.e., the range), and 2) the net effect of multipath delay spread). This amplitude and this effective delay may vary depending on the way the individual components of the multipath (e.g., LOS and reflections) add up vectorially (e.g., amplitudes and phases), for example, whether they combine coherently/constructively, destructively, or some way in between. Consequently, if options are available, the objective should be to select frequencies that minimize the delay due to multipath (e.g., the best scenario occurs when reflections add destructively, thus only LOS remains).

In addition, the most accurate differential-range measurements (e.g., accurate in the correct estimation of effective delay) may be obtained when the components of multipath (e.g., LOS and/or reflections) add coherently or nearly coherently, that is, at frequencies and locations for which the fading amplitudes are high (e.g., the signal "fades in"); the opposite may be true when fading amplitudes are low (the signal "fades out"). Hence, a variety/multitude of frequencies, and particularly the selection of frequency points that are wide apart (e.g., separated by more than the coherence bandwidth of the channel) may allow for obtaining frequencies that improve differential-range measurements. Therefore, the CW discovery stage in this approach may also have the purpose of selecting frequencies yielding the best fading conditions (e.g., highest amplitude levels for the system transfer function), least multipath, least delay, and/or better differential range calculations.

In embodiments, there may be some approaches—to be used in tandem with the direct communications between ZE WTRU and facilitators—that can be leveraged to mitigate the effect of multipath.

In one approach, backscattering (e.g., without modulation) may be used to reflect back the CW's to the facilitators, which in turn can estimate the two-way channel multipath and fading conditions with the objective of selecting the best frequencies (e.g., facilitators make the decisions on the suitability of the CW's rather than the ZE WTRU). Backscattering may also be used to share the measurement values with the facilitators. Directional backscattering may be leveraged to determine the direction from the ZE WTRU with best fading conditions or least path delay.

In one approach, directional antennas or multibeam antennas at the ZE WTRU may reduce the multipath, and a beam may be selected that results in the lowest path delay.

In one approach, sidelink (LTE- or NR-based) may be used to share information between ZE WTRU and the facilitators (e.g., selected frequencies, configurations/parameters, measurements) and also for inter-facilitator communication. Alternatively, information may be conveyed from the facilitators to the ZE WTRU via ZE air interface similar to that used in 802.11ba.

In some scenarios, there may be an objective to leverage direct ZE WTRU-facilitator communications to further improve the selection of best resources and channel conditions that are dynamically used for the measurements involved in Differential MF-PDOA and thus further improve the positioning accuracy.

In a scheme where a facilitator transmits at static frequencies, during the discovery stage, each facilitator transmits at one or more frequencies specific to the facilitator. The ZE WTRU may then inform the facilitators via backscattering, or over the ZE air interface, which facilitators and frequencies were selected. Prior to the discovery stage, the facilitator may do backscattering to determine which ZE WTRUs are present; then CW's from each facilitator that detect the ZE WTRU may be transmitted sequentially: A first facilitator transmits CW's sequentially then queries the ZE WTRU (e.g., via backscattering or sidelink) to report measurement or chosen frequencies; A second facilitator then transmits CW's sequentially and performs the queries. This procedure may be repeated until all facilitators that detected the ZE WTRU are exhausted. The facilitators may share the collected information with the AN; in turn, the AN may start radiating the CW-RS and organizes (e.g., selects and configures) the facilitators to participate in the Differential MF-PDOA measurements.

In a scheme where a facilitator performs frequency sweeping, facilitators may have the capability to sweep frequencies across one or more entire bands (e.g., an ISM band) or a large portion thereof so that ZE WTRUs can determine the frequencies with optimal channel conditions (e.g., signal "fades in" as multipath components add constructively) for each facilitator.

Facilitators may perform backscattering to discover the ZE WTRUs that are present in the vicinity. The backscatter message may contain the identification of the ZE WTRU. Those facilitators that receive a response from a given ZE WTRU may report this information to the AN; in turn, the AN may manage the order in which facilitators perform the frequency sweeping. After each facilitator completes the frequency sweeping, it may interrogate the target ZE WTRU via backscattering or sidelink to report the frequencies it has selected. The frequencies may be provided in order of preference. Alternatively, the frequencies and corresponding RSSI values may be provided. Alternatively, the facilitator may backscatter while covering (e.g., sweeping) different frequencies and measuring the strength and delay of the backscattered signal for each frequency.

Figure 14:
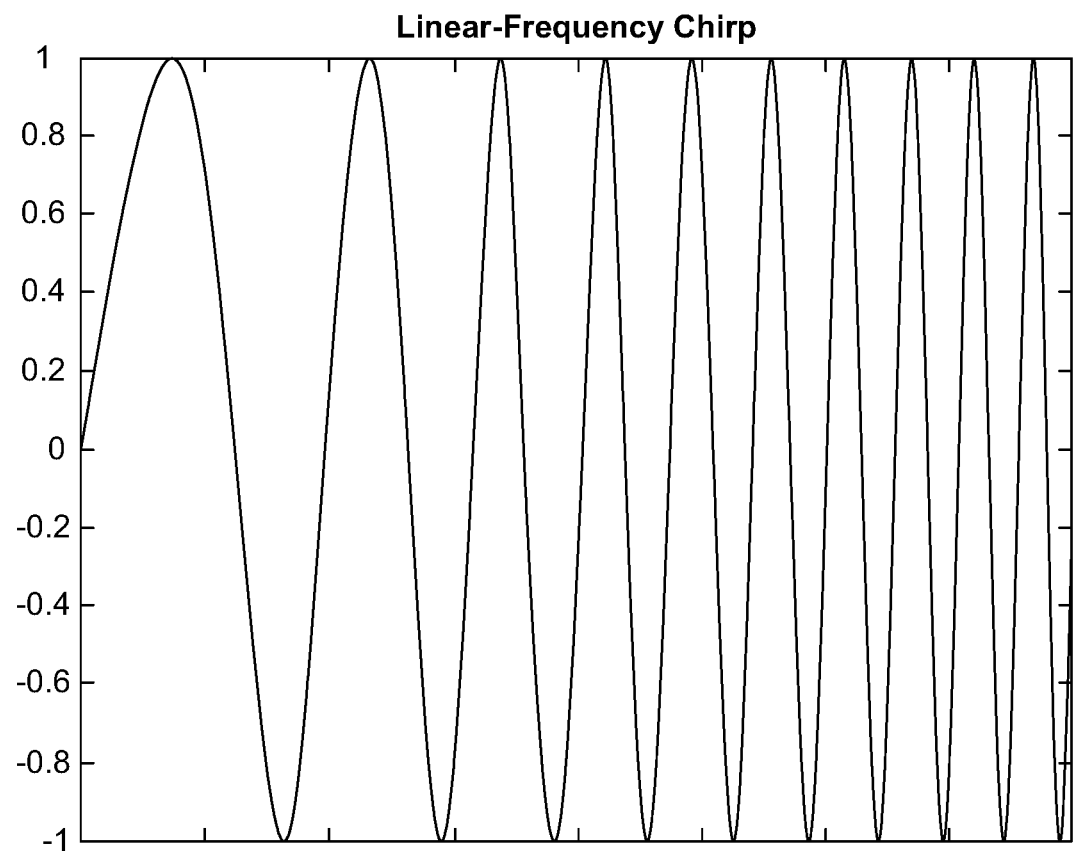
FIG. 14 is a diagram illustrating of an example linear-frequency chirp.

In one scheme there may be discrete-frequency sweep (e.g., facilitators radiate at predetermined discrete frequency values covering a range, these values known to the ZE WTRU). Alternatively, there may be a continuous-frequency sweep (e.g., facilitators radiating a CW with gradually-changing frequency, i.e., a "linear-frequency chirp" as in FIG. 14). For this approach, determining the best frequencies may be done only via backscattering. Continuous-frequency sweep with backscattering may have the advantage in some circumstances that the facilitator may determine the best frequency points not just from the standpoint of fading but also antenna/RFE response from the device.

Subsequently, this procedure (e.g., frequency sweeping CW's followed by interrogation via backscattering or simply backscattering the CW's) may be repeated for each facilitator that originally was able to detect backscattering from the ZE WTRU in question, and the information may be shared with AN. The AN may organize the facilitators that will participate in the Differential MF-PDOA measurements.

In a scheme where a ZE WTRU performs beam sweeping, the ZE WTRU may use beam-switch antennas to choose or help choose the beams with the best gain or the lowest path delay (e.g., to reduce the effect of multipath). The discovery and the PDOA measurements may be done at the ZE WTRU and reported to the facilitator via backscattering, sidelink, or ZE air interface. The duration of the CW's for discovery $T_1$ and PDOA measurements $T_M$ may be increased by a factor equal to the number of beams that are supported by the ZE WTRU. Alternatively, the measurements may be performed at the facilitators via backscattering.

Each facilitator may have a limited number of frequencies to use for discovery, possibly even only one. For each frequency, the facilitator radiates a CW.

The ZE WTRU may need to inform the facilitator how many beams it is able to support.

Figure 15:
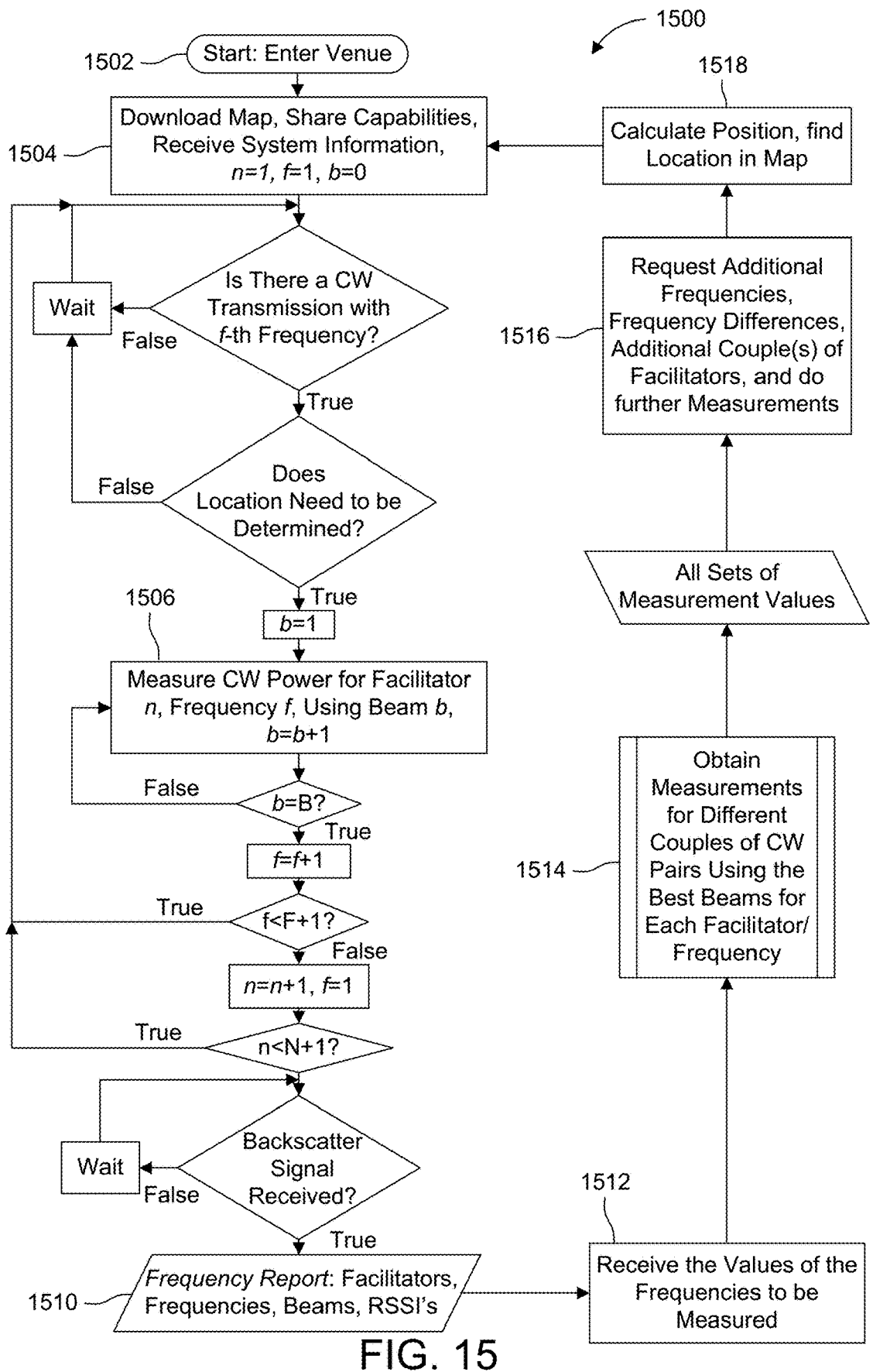
FIG. 15 is a flowchart of a method for frequency and beam sweeping in accordance with an example embodiment.

In a scheme where there is frequency and beam sweeping, there may be procedures as discussed herein, such as the examples related to facilitators perform frequency sweeping and ZE WTRUs performing beam sweeping, and they may be combined so that both frequency sweeping at the facilitator and beam sweeping at the ZE WTRU are performed during the discovery stage and during the measurement stage. FIG. 15 illustrates an example flowchart for frequency and beam sweeping.

In one embodiment 1500, a ZE WTRU equipped with a bank of MEMS transformers (e.g., the cardinality/number and transformer bandwidths of which adequately cover a given range of frequencies) and multi-directional antennas may be permanently listening out for CW's through one or multiple receive beams/directions. With periodicity $T_p$, CW's are received from facilitators. Alternatively, CW's may be radiated aperiodically at the request of the ZE WTRU or facilitator. When the ZE WTRU first comes to the venue, at 1502, it may acquire the map of the venue using the main transceiver, shares its ZE WTRU capabilities (e.g., number of beams, time spent per beam, bandwidth and center frequency of each transformer, number of facilitators it can detect simultaneously, and others) with the AN, and receive the system parameters (e.g., periodicity, duration of CW's used in discovery, discrete or continuous frequency sweeping, facilitator or ZE WTRU determines best frequencies, and other parameters) at 1504. Additionally, as the ZE WTRU roams around the venue and comes into the vicinity of different facilitators, it may receive (e.g., via sidelink or ZE air interface) individual system parameters for the facilitators when they differ from the system parameters shared by the AN. The ZE WTRU device may also provide the facilitators in its neighborhood with its identification information (e.g., so that facilitators may associate to the ZE WTRU information previously shared by the AN).

At 1506, a ZE WTRU may determine that the radiation of CW's (e.g., for the discovery stage) has been initiated either from the detection of periodic transmissions or from direct information from the facilitators received via sidelink or ZE air interface. The ZE WTRU may try the first beam/direction. The radiation may takes place sequentially one facilitator at a time, or more facilitators can be done too. Then, the ZE WTRU may try the remaining beams before the frequencies of the CW's have changed. Thereafter, the frequencies of the CW may be changed, and the ZE WTRU may again attempt all the beams/directions it can support. Subsequently, the ZE WTRU may determine the strongest frequencies and beams/directions, or which combinations of frequencies and beams yield the shortest paths, and record the beam number per frequency per facilitator identity. At 1510, the ZE WTRU may report the frequencies and corresponding RSSI's, and possibly beams/directions, to the facilitator using backscattering or sidelink (e.g., and at this point, the ZE WTRU may obtain the identity of the facilitator). Then, for a different facilitator, the ZE WTRU may repeat the process for all beams/directions as well as frequencies and repeat the reporting action. At 1512, via sidelink or ZE air interface, the ZE WTRU may obtain (e.g., from one facilitator) the frequencies, frequency difference, and possibly the duration and identity/locations of the facilitators, per facilitator that will be used for the measurement stage. At 1514, the ZE WTRUs may perform the measurement either using the best beams (e.g., by referring to the beam number per frequency per facilitator determined in the fourth step) or using all the beams. In some instances, facilitators may request the measurement; the device may report back via backscattering or sidelink. Thereafter, the actions of 1512 and 1514 may be repeated for different frequencies and frequency differences and may be repeated for a different couple of facilitators. The ZE WTRU—via sidelink, backscatter, or ZE air interface—may, at 1516, request additional frequencies, frequency differences, additional couple(s) of facilitators and do further measurements. At 1518, the ZE WTRU may trace all the measurements to the previously downloaded map.

Alternatively, the beam and frequency selection in the discovery stage may take place via backscattering as follows. At 1506, a CW may be received from the facilitator for each frequency sequentially; for each frequency, the ZE WTRU may attempt each beam sequentially. The ZE WTRU may not need to report RSSI (e.g., as RSSI is measured at facilitator) or beam (e.g., as facilitator deduces the beam from the timing of the backscattered CW and possibly detection of changes in the backscattered RSSI) at 1510. At 1512, however, the ZE WTRU may receive information on the beam to use for each frequency.

Alternatively, the beam and frequency selection in the discovery stage may occur via continuous-frequency-sweep backscattering with a ZE WTRU applying beam switching, and/or directional backscattering. The ZE WTRU may maintain one beam/direction while it receives the CW with gradually changing frequency from one facilitator; subsequently, a ZE device may again receive (e.g., using a different beam/direction) a retransmission of the same CW from the same facilitator. The procedure may then be repeated for a different facilitator.

In another embodiment, at 1504, facilitators may receive from the AN the capabilities of ZE WTRUs in the cell area (e.g., capabilities such as frequencies supported, number of beams, CW measurement duration time, etc.). Thereafter, the facilitators may periodically initiate transmission of a CW at a fixed, initial discrete frequency (a frequency that is part of a frequency raster) for a given amount of time that takes into account the number of beams of the target ZE WTRU, one facilitator in the neighborhood at a time, and then observes a small pause. Then, the facilitator may repeat the CW transmission in the second step at the remaining frequencies of the raster. At 1510, the facilitator may receive—via backscatter or sidelink—frequency reports from the ZE WTRU containing frequencies, beams, and/or RSSI values. With a small pause, covering all the frequencies in the frequency raster, this procedure may be repeated for the other facilitators in the neighborhood. Subsequently, the facilitator shares all the frequency reports with the AN. At 1512, the facilitator may receive a schedule of CW frequencies, frequency differences to transmit, and information on backscattering for measurement reports from ZE WTRUs. At 1514, the facilitator may transmit a pair of CW's with the frequencies and frequency differences requested. Then, the facilitator may backscatter the ZE WTRU to receive the measurement reports. The transmission and backscatter actions may be repeated until all the items in the schedule received at 1512 are completed.

Alternatively, at 1504, the facilitator may use backscattering: a CW is at given frequencies, and the signal backscattered from the ZE WTRU is measured.

Alternatively, instead of transmitting a CW at a fixed, initial discrete frequency, the facilitator may transmit a linear-frequency chirp CW while device tries one beam/direction; while the subsequent actions may be repeated for the remaining beams/directions.

Alternatively, at 1510, the facilitators—having been informed of some best frequencies through the frequency report—may now redo the initiation or transmission of CWs but focusing on frequency ranges around those best frequencies using a finer frequency spacing (e.g., essentially, an approach that can be referred as fine-frequency selection).

In another embodiment, initially at 1504, an AN may receive capability information from a ZE WTRU itself, or from other AN's covering the venue, when it first comes into the venue, and shares system information from the facilitators in the area with the ZE WTRU when the capability information comes directly from the ZE WTRU. Then, the AN may disseminate the capability information to the associated facilitators in the area. Subsequently, the AN manages/coordinates the order in which associated facilitators transmit: the AN ensures that facilitators transmit CW's in parallel only when they meet a certain minimum inter-facilitator distance (e.g., to ensure there is no co-channel CW interference) while at the same time reducing the amount of time any ZE WTRU is idle awaiting the next CW. At 1510, the AN may help processing the frequency reports (e.g., facilitators, frequencies, beams) from ZE WTRUs to determine the frequencies and frequency differences used in the measurement stage for each ZE WTRU.

Figure 16:
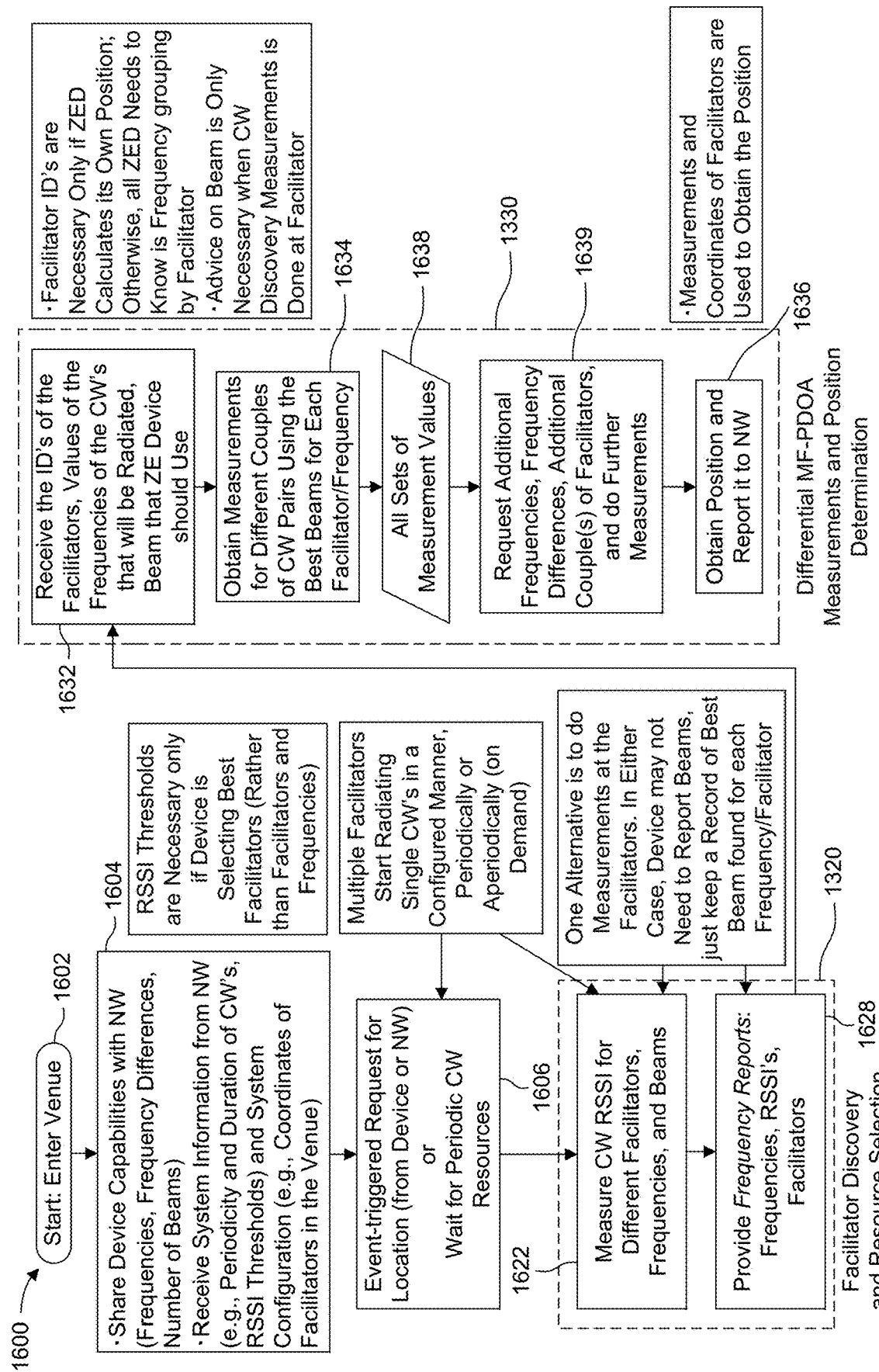
FIG. 16 is a flowchart illustrating a method in accordance with an example embodiment.

In one embodiment 1600 as seen in FIG. 16, at 1602, a ZE WTRU may enter a venue and share, at 1604, its capabilities with the AN, receives system information, and system-configuration information (e.g., which includes coordinates of the facilitators). Then at 1606, ZE WTRU may request or receive a request—via sidelink, backscatter, or ZE air interface—to obtain its position. Alternatively, a ZE WTRU periodically reports its position. At 1622, the ZE WTRU may receive a CW at a certain frequency from a facilitator; the ZE WTRU may cycle through beams and records the best beam per frequency and facilitator. The actions of 1622 may repeat for other facilitators in its neighborhood (e.g., facilitators that have discovered the device via backscattering). At 1628, the ZE WTRU may provide a frequency report 1200 containing RSSI values per frequency and facilitator. At 1632, ZE WTRU may receive the identification of the facilitators that may be radiating CW pairs shortly and the frequencies of the CW's. At 1634, the device performs PDOA measurement using first CW pairs (e.g., for given frequency difference) per couple of facilitators; the ZE WTRU may repeat the performing the PDOA measurement action for second CW pairs (e.g., for a different frequency difference). Thereafter, the ZE WTRU may repeat the actions of 1634 for a different couple of facilitators. At 1638, the ZE WTRU may consolidate and processes all the current measurement values to determine a need for any additional measurements. At 1639, a ZE WTRU may request additional CW's with other frequencies and frequency differences, and facilitator couples, and may repeat the actions of 1632, 1634, and 1638. At 1636, the ZE WTRU may calculate its position using all the measurement values and coordinates of the facilitators and report the position to the network via sidelink, backscatter, or ZE air interface.

In addition to PDOA measurements at the ZE WTRU for couples of facilitators at a time, the measurement may be done at the facilitators via backscattering: one facilitator transmits one or more CW's, which are backscattered by the ZE WTRU, and the signal may be received at multiple facilitators.

For one facilitator, for instance, three CW's with proper frequency difference may be backscattered off a ZE WTRU and PDOA's measured at the facilitator. Then CRT and Eq. 20 may be applied to obtain a range below a certain maximum unambiguous range. The process may be repeated for other facilitators to obtain additional ranges which would altogether determine the position.

Another possibility is for AN to transmit CW-RS at 900 and 903 MHz, then one facilitator transmits CW's at 906 and 909 MHz (e.g., for a frequency difference of 3 MHz); the backscattered signal may be received back at the source facilitator and neighbor facilitators. The differential range may be obtained by leveraging at each facilitator the received signals along with the CW-RS (e.g., adjusted for delay to the AN) and comparing the result from one facilitator against another.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit receive unit (WTRU) that is configured for use in a zero energy (ZE) interface, the method comprising:
   receiving a message indicating a plurality of positioning reference signal (PRS) configurations, wherein each PRS configuration provides frequency and time resources for reception, by the WTRU, of a plurality of PRSs, and wherein the message indicates a default PRS configuration;
   upon a condition that the default PRS configuration is not suitable for one or more capabilities or requirements of the WTRU, transmitting a message including a request to use another one of the plurality of PRS configurations, wherein the another one of the plurality of PRS configurations is requested based on the one or more capabilities or requirements of the WTRU;
   receiving a message indicating ranging assistance information applicable during a time duration;
   receiving, within the time duration, the plurality of PRSs using the another one of the plurality of PRS configurations and using the indicated ranging assistance information; and
   transmitting a report indicating a range estimate that meets a required accuracy, wherein the range estimate is based on a phase difference of arrival (PDOA) of the received plurality of PRSs.

2. The method of claim 1, wherein the message indicating ranging assistance information applicable during the time duration includes an indication of the time duration.

3. The method of claim 1, wherein the ranging assistance information includes one or more supported range resolutions and one or more multiplexing parameters.

4. The method of claim 1, further comprising transmitting a message indicating the one or more capabilities or requirements of the WTRU.

5. The method of claim 1, wherein the report indicating the range estimate is transmitted in response to a message requesting the range estimate.

6. The method of claim 1, further comprising on a condition that the PDOA is determined to not be sufficiently reliable or on a condition that the range estimate is determined to not be sufficiently accurate, transmitting another message including a request to use a further one of the plurality of PRS configurations, wherein parameters of the further one of the plurality of PRS configurations differ from parameters of previously used PRS configurations.

7. The method of claim 1, wherein parameters of the another PRS configuration are a subset of or a superset of parameters of a default PRS resource.

8. The method of claim 1, wherein the message including the request to use another one of the plurality of PRS configurations includes an indication of a PRS Set ID or a device ID.

9. The method of claim 1, wherein the suitability of a PRS configuration for use by the WTRU is determined based on a subset of frequency co-prime factors supported by the WTRU.

10. The method of claim 1, wherein the range estimate is based on quantized PDOA values and associated co-prime factors.

11. A wireless transmit/receive unit (WTRU) configured to communicate through a zero energy (ZE) interface, the WTRU comprising:
    a transceiver; and
    a ZE transceiver;
    the transceiver configured to receive a message indicating a plurality of positioning reference signal (PRS) configurations, wherein each PRS configuration provides frequency and time resources for reception, by the WTRU, of a plurality of PRSs, and wherein the message indicates a default PRS configuration;
    upon a condition that the default PRS configuration is not suitable for one or more capabilities or requirements of the WTRU, transmit a message including a request to use another one of the plurality of PRS configurations, wherein the another one of the plurality of PRS configurations is requested based on the one or more capabilities or requirements of the WTRU; and
    receive a message indicating ranging assistance information applicable during a time duration;
    the ZE transceiver configured to receive, within the time duration, the plurality of PRSs using the another one of the plurality of PRS configurations and using the indicated ranging assistance information; and
    the transceiver configured to transmit a report indicating a range estimate that meets a required accuracy, wherein the range estimate is based on a phase difference of arrival (PDOA) of the received plurality of PRSs.

12. The WTRU of claim 11, wherein the message indicating ranging assistance information applicable during the time duration includes an indication of the time duration.

13. The WTRU of claim 11, wherein the ranging assistance information includes one or more supported range resolutions and one or more multiplexing parameters.

14. The WTRU of claim 11, the transceiver configured to transmit a message indicating the one or more capabilities or requirements of the WTRU.

15. The WTRU of claim 11, wherein the report indicating the range estimate is transmitted in response to a message requesting the range estimate.

16. The WTRU of claim 11, the transceiver configured to, on a condition that the PDOA is determined to not be sufficiently reliable or on a condition that the range estimate is determined to not be sufficiently accurate, transmit another message including a request to use a further one of the plurality of PRS configurations, wherein parameters of the further one of the plurality of PRS configurations differ from parameters of previously used PRS configurations.

17. The WTRU of claim 11, wherein parameters of the another PRS configuration are a subset of or a superset of parameters of a default PRS resource.

18. The WTRU of claim 11, wherein the message including the request to use another one of the plurality of PRS configurations includes an indication of a PRS Set ID or a device ID.

19. The WTRU of claim 11, wherein the suitability of a PRS configuration for use by the WTRU is determined based on a subset of frequency co-prime factors supported by the WTRU.

20. The WTRU of claim 11, wherein the range estimate is based on quantized PDOA values and associated co-prime factors.

\* \* \* \* \*